(12) United States Patent
Meylan et al.

(10) Patent No.: US 9,179,397 B2
(45) Date of Patent: Nov. 3, 2015

(54) WIRELESS LOCAL AREA NETWORK DISCOVERY USING NON-WLAN TIMING REFERENCE

(71) Applicant: Qualcomm Incorporated, San Diego, CA (US)

(72) Inventors: Arnaud Meylan, San Diego, CA (US); Rajat Prakash, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 326 days.

(21) Appl. No.: 13/753,315

(22) Filed: Jan. 29, 2013

(65) Prior Publication Data

US 2014/0056192 A1 Feb. 27, 2014

Related U.S. Application Data

(60) Provisional application No. 61/691,942, filed on Aug. 22, 2012.

(51) Int. Cl.
*H04W 48/16* (2009.01)
*H04W 56/00* (2009.01)

(52) U.S. Cl.
CPC ............ *H04W 48/16* (2013.01); *H04W 56/001* (2013.01); *Y02B 60/50* (2013.01)

(58) Field of Classification Search
CPC ..... H04W 48/16; H04W 56/001; Y02B 60/50
See application file for complete search history.

(56) References Cited

U.S. PATENT DOCUMENTS

| 7,564,812 B1* | 7/2009 | Elliott | H04W 48/08 370/329 |
| 8,254,355 B2 | 8/2012 | Park | |
| 2006/0039332 A1* | 2/2006 | Kotzin | 370/338 |
| 2009/0262662 A1* | 10/2009 | Ramachandran | H04W 24/04 370/254 |

(Continued)

FOREIGN PATENT DOCUMENTS

| EP | 2424304 A1 | 2/2012 |
| WO | 2008043048 A1 | 4/2008 |

OTHER PUBLICATIONS

International Search Report and Written Opinion—PCT/US2013/055887—ISA/EPO—Nov. 20, 2013.

*Primary Examiner* — Ajay Cattungal
(74) *Attorney, Agent, or Firm* — QUALCOMM IP Department; James Hunt Yancey, Jr.

(57) ABSTRACT

Methods, systems, and devices are described for assisting discovery of a wireless local area network (WLAN). A timing reference originating from a first radio technology is identified by a user equipment (UE). A WLAN receiver of the UE is woken up according to a beacon transmission schedule to listen for a beacon on the WLAN. The first radio technology is a non-WLAN radio technology, and the beacon transmission schedule is based at least in part on the timing reference. The timing reference originating from the first radio technology is identified by a Wireless Access Point (WAP). The WAP broadcasts a beacon on the WLAN according to the beacon transmission schedule.

53 Claims, 16 Drawing Sheets

(56) References Cited

U.S. PATENT DOCUMENTS

| | | | |
|---|---|---|---|
| 2009/0264162 A1* | 10/2009 | Ramachandran | H04W 52/243 455/572 |
| 2009/0303975 A1 | 12/2009 | Xhafa et al. | |
| 2010/0142500 A1 | 6/2010 | Sudak | |
| 2010/0303047 A1* | 12/2010 | Ibrahim | H04W 4/001 370/338 |
| 2010/0303183 A1* | 12/2010 | Desai | H04L 5/0062 375/350 |
| 2012/0034913 A1 | 2/2012 | Wang et al. | |
| 2012/0189020 A1* | 7/2012 | Rustagi | H04L 41/0806 370/419 |
| 2012/0276938 A1 | 11/2012 | Wagholikar et al. | |

\* cited by examiner

WIRELESS LOCAL AREA NETWORK DISCOVERY USING NON-WLAN TIMING REFERENCE

CROSS REFERENCES

The present Application for Patent claims priority benefit to U.S. Provisional Patent Application No. 61/691,942, entitled "Passive Wi-Fi Scan Using Cellular Timing" by Meylan et al., filed Aug. 22, 2012, and assigned to the assignee hereof.

BACKGROUND

Many mobile devices are capable of connecting to Wireless Access Points (WAPs) to transmit and receive data. Before connecting to a WAP, a mobile device may conduct a search to discover WAPs within range of the mobile device. Conventional methods for discovering WAPs include passive scanning and active scanning.

In passive scanning (also known as beacon scanning), a mobile device may dwell on each channel of a Wireless Local Area Network (WLAN) and wait to receive a beacon from a WAP on each channel. The mobile device may dwell on each channel for a time between a minimum and maximum limit. In active scanning (also known as probe scanning), the mobile device may broadcast a single probe request (e.g., on a given channel) and wait for a response from WAPs within range of the mobile device.

In a typical WAP discovery process using passive or active scanning, the mobile device may spend a good portion of its power transmitting probe requests to, or listening for beacons or responses from, WAPs that either are nonexistent or do not ultimately establish a connection with the mobile device. Because the radio resources used to transmit and receive wireless communications may consume a significant amount of power, searching for WLAN access points using these conventional methods may be power inefficient and may shorten the usable battery life of the mobile device.

SUMMARY

The described features generally relate to one or more systems, methods, and/or apparatuses for assisting discovery of a WLAN. On the user equipment (UE) side, the UE may identify a timing reference originating from a first radio technology and may wake a WLAN receiver according to a beacon transmission schedule to listen for a beacon on the WLAN. The first radio technology may be a non-WLAN radio technology, and the beacon transmission schedule may be based at least in part on the timing reference. On the WAP side, the WAP may identify a timing reference originating from the first radio technology and may broadcast a beacon on a channel of the WLAN according to the beacon transmission schedule.

A method for assisting discovery of a WLAN is described. In one configuration, a user equipment (UE) may identify a timing reference originating from a first radio technology, wherein the first radio technology may be a non-WLAN radio technology. A WLAN receiver may then be woke according to a beacon transmission schedule to listen for a beacon on the WLAN. The beacon transmission schedule may be based at least in part on the timing reference.

In some embodiments, the beacon transmission schedule may indicate when a beacon transmission period occurs on the WLAN.

In other embodiments, a beacon may be received from a first WAP in a first WLAN during one or more beacon transmission periods, and a connection may be established with the first WAP in the WLAN.

In some configurations, a plurality of beacons may be received during a single beacon transmission period. The plurality of beacons may be received from a plurality of WAPs in a first WLAN.

In some embodiments, the WLAN receiver may be returned to a sleep state following the beacon transmission period.

In other embodiments, the beacon transmission period may correspond to a first channel of operation of the WLAN, and the WLAN receiver may be kept awake during a second beacon transmission period corresponding to a second channel of operation of the WLAN. The second beacon transmission period may follow the first beacon transmission period. In some cases, the WLAN receiver may be also kept awake during an offset between the beacon transmission period and the second beacon transmission period. The offset may be based on at least a time to tune the WLAN receiver from the first channel to the second channel.

In some configurations, the beacon transmission schedule may be received from a source including the non-WLAN radio technology.

In other configurations, the timing reference may be transmitted to one or more WAPs in a first WLAN.

In still other configurations, the timing reference may be a timing of a cellular network or a satellite network.

In some embodiments, a beacon receipt time of a beacon received via the WLAN receiver from a first WAP may be recorded; a beacon timing correction may be computed based on the beacon receipt time and a beacon transmission time indicated by the beacon transmission schedule; and the beacon timing correction may be transmitted.

In other embodiments, a beacon receipt time of a beacon received via the WLAN receiver from a first WAP may be recorded; a beacon timing correction may be computed based on the beacon receipt time and a beacon transmission time indicated by the beacon transmission schedule; a magnitude of the beacon timing correction may be compared to a threshold; and the beacon timing correction may be transmitted when the magnitude of the beacon timing correction exceeds the threshold.

In some configurations, the timing reference may be selected from among a plurality of available timing references.

A UE for assisting discovery of a WLAN is also described. The UE may include a processor, a memory in electronic communication with the processor, and instructions stored in the memory. The instructions may be executable by the processor to identify a timing reference originating from a first radio technology. A WLAN receiver may then be woke according to a beacon transmission schedule to listen for a beacon on the WLAN. The first radio technology may be a non-WLAN radio technology. The beacon transmission schedule may be based at least in part on the timing reference.

In some embodiments, the beacon transmission schedule may indicate when a beacon transmission period occurs on the WLAN.

In other embodiments, the instructions may be executable by the processor to receive a beacon from a first WAP in a first WLAN during one or more beacon transmission periods, and establish a connection with the first WAP in the WLAN.

In some configurations, the instructions may be executable by the processor to receive a plurality of beacons during a single beacon transmission period. The plurality of beacons may be received from a plurality of WAPs in a first WLAN.

In some embodiments, the instructions may be executable by the processor to return the WLAN receiver to a sleep state following the beacon transmission period.

In other embodiments, the beacon transmission period may correspond to a first channel of operation of the WLAN, and the instructions may be executable by the processor to keep the WLAN receiver wake during a second beacon transmission period corresponding to a second channel of operation of the WLAN. The second beacon transmission period may follow the first beacon transmission period. In some cases, the instructions may also be executable by the processor to keep the WLAN receiver awake during an offset between the beacon transmission period and the second beacon transmission period. The offset may be based on at least a time to tune the WLAN receiver from the first channel to the second channel.

In some configurations, the instructions may be executable by the processor to receive the beacon transmission schedule from a source including the non-WLAN radio technology.

In other configurations, the instructions may be executable by the processor to transmit the timing reference to one or more WAPs in a first WLAN.

In still other configurations, the timing reference may be a timing of a cellular network or a satellite network.

In some embodiments, the instructions may be executable by the processor to record a beacon receipt time of a beacon received via the WLAN receiver from a first WAP; compute a beacon timing correction based on the beacon receipt time and a beacon transmission time indicated by the beacon transmission schedule; and transmit the beacon timing correction.

In other embodiments, the instructions may be executable by the processor to record a beacon receipt time of a beacon received via the WLAN receiver from a first WAP; compute a beacon timing correction based on the beacon receipt time and a beacon transmission time indicated by the beacon transmission schedule; compare a magnitude of the beacon timing correction to a threshold; and transmit the beacon timing correction when the magnitude of the beacon timing correction exceeds the threshold.

In some configurations, the instructions may be executable by the processor to select the timing reference from among a plurality of available timing references.

Another UE for assisting discovery of a WLAN is also described. In one configuration, the UE may include a means for identifying a timing reference originating from a first radio technology. The first radio technology may be a non-WLAN radio technology. The UE may also include a means for waking a WLAN receiver according to a beacon transmission schedule to listen for a beacon on the WLAN. The beacon transmission schedule may be based at least in part on the timing reference.

In some embodiments, the beacon transmission schedule may indicate when a beacon transmission period occurs on the WLAN.

In other embodiments, the UE may further include a means for receiving a beacon from a first WAP in a first WLAN during one or more beacon transmission periods, and a means for establishing a connection with the first WAP in the WLAN.

In still other embodiments, the UE may further include a means for returning the WLAN receiver to a sleep state following the beacon transmission period.

In some configurations, the timing reference may be a timing of a cellular network or a satellite network.

A computer program product for assisting discovery of a WLAN is also described. The computer program product may include a non-transitory computer-readable medium storing instructions executable by a processor to: identify, by a UE, a timing reference originating from a first radio technology, and wake a WLAN receiver according to a beacon transmission schedule to listen for a beacon on the WLAN. The first radio technology may be a non-WLAN radio technology. The beacon transmission schedule may be based at least in part on the timing reference.

In some embodiments, the beacon transmission schedule may indicate when a beacon transmission period occurs on the WLAN.

In other embodiments, the instructions may be executable by the processor to receive a beacon from a first wireless access point (WAP) in a first WLAN during one or more beacon transmission periods, and establish a connection with the first WAP in the WLAN.

In still other embodiments, the instructions may be executable by the processor to return the WLAN receiver to a sleep state following the beacon transmission period.

In some configurations, the timing reference may be a timing of a cellular network or a satellite network.

Another method for assisting discovery of a WLAN is also described. In some configurations, a timing reference originating from a first radio technology may be identified. A beacon is then broadcast on the WLAN according to a beacon transmission schedule. The first radio technology may be a non-WLAN radio technology. The beacon transmission schedule may be based at least in part on the timing reference.

In some embodiments, the timing reference may be received from a source including the non-WLAN radio technology.

In other embodiments, the timing reference may be received from a back-end server according to a network time protocol (NTP).

In some configurations, the timing reference may be received on the WLAN from a UE.

In some embodiments, the beacon transmission schedule may be received from a source including the non-WLAN radio technology.

In some cases, the beacon transmission schedule may be broadcast to one or more UEs using the non-WLAN radio technology.

In some embodiments, the beacon transmission schedule may indicate when a beacon transmission period occurs on the WLAN, and one of a plurality of time slots within the beacon transmission period may be selected to broadcast the beacon. The beacon may then be inserted into the selected time slot. Selecting one of the plurality of time slots may include performing a hash function on a media access control (MAC) address.

In other embodiments, the beacon transmission schedule may indicate when a beacon transmission period occurs on the WLAN, and broadcasting the beacon may include broadcasting the beacon at a random time within the beacon transmission period.

In some embodiments, a beacon timing correction may be received, and the beacon may be broadcast according to the beacon timing correction.

In still other embodiments, the timing reference may be a timing of a cellular network or a satellite network.

In some configurations, the timing reference may be selected from among a plurality of available timing references.

A WAP for assisting discovery of a WLAN is also described. In some configurations, the WAP may include a processor, a memory in electronic communication with the processor; and instructions stored in the memory. The instructions may be executable by the processor to identify a timing reference originating from a first radio technology and broadcast a beacon on the WLAN according to a beacon transmission schedule. The first radio technology may be a non-WLAN radio technology. The beacon transmission schedule may be based at least in part on the timing reference.

In some embodiments, the instructions may be executable by the processor to receive the timing reference from a source comprising the non-WLAN radio technology.

In other embodiments, the instructions may be executable by the processor to receive the timing reference from a back-end server according to a NTP.

In still other embodiments, the instructions may be executable by the processor to receive the timing reference on the WLAN from a UE.

In some configurations, the instructions may be executable by the processor to receive the beacon transmission schedule from a source.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present systems and methods may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Management of WLAN discovery in a wireless communications system is described. In a wireless communications system having WAPs and UEs capable of communicating via a WLAN, discovery of the WLAN by the UEs may be made more efficient by using a timing reference originating from a non-WLAN radio technology such as, but not limited to, a cellular network or a satellite network (e.g., a Global Positioning System (GPS)). In one example, a WAP may identify or receive the timing reference and use it to broadcast a beacon on the WLAN according to a beacon transmission schedule that is based at least in part on the timing reference. Likewise, a UE may identify the timing reference and use it to wake a WLAN receiver of the UE according to the beacon transmission schedule. Because the timing reference originates from a non-WLAN radio technology, the UE may be able to acquire the timing reference more efficiently, and in advance of when it needs to listen for a beacon on the WLAN, thereby enabling the UE to wake the WLAN receiver during a smaller time window around the time it expects the WAP to broadcast its beacon, thereby conserving the UE's power.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
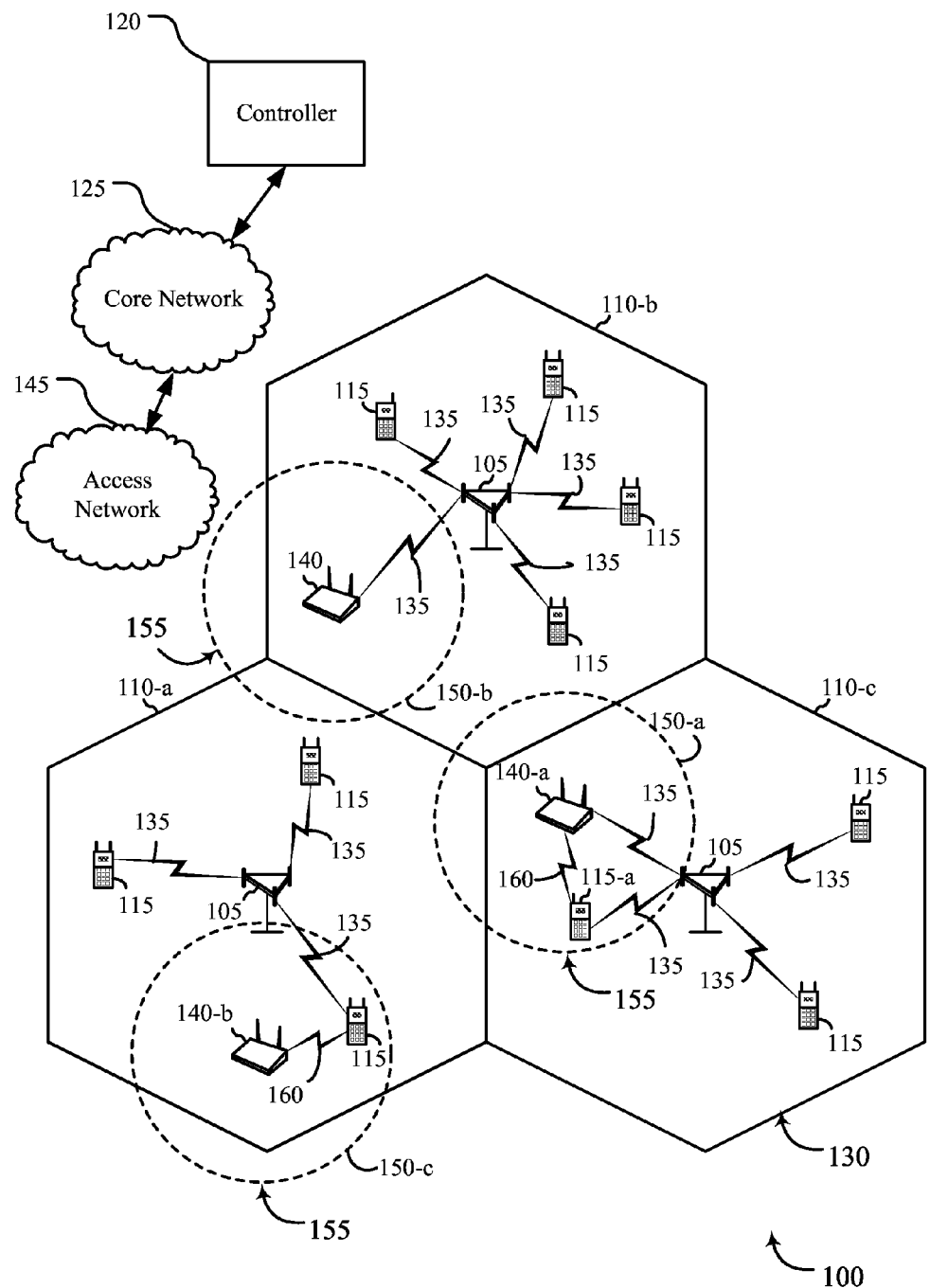
FIG. 1 shows a block diagram of an example of a wireless communications system.

Referring first to FIG. 1, a block diagram illustrates an example of a wireless communications system 100 in accordance with various embodiments. The system 100 includes components capable of communicating via a WLAN radio technology (e.g., a WLAN 155) and components capable of communicating via a non-WLAN radio technology (e.g., a cellular network 130). Some components are capable of communicating via both radio technologies.

The components capable of communicating via the cellular network 130 include base stations 105 (or cells), UEs 115, a base station controller 120, WAPs 140, and a core network 125. In some embodiments, the controller 120 may be integrated into the core network 125, and in other embodiments, the controller 120 may be integrated into base stations 105. The components capable of communicating via the WLAN 155 may include the WAPs 140, some or all of the UEs 115, the core network 125, and an access network 145.

The UEs 115 may be variously referred to as mobile devices, mobile stations, access terminals (ATs), subscriber units, stations (STAB), or subscriber stations (SSs). The UEs 115 may include cellular phones, wireless communications devices, personal digital assistants (PDAs), smartphones, tablets, other handheld devices, netbooks, notebook computers, or any type of wireless or mobile communications device. Some of the UEs 115 may be capable of communicating via both the cellular network 130 and the WLAN 155.

The cellular network 130 may support operation on multiple carriers (waveform signals of different carrier frequencies). Multi-carrier transmitters may transmit modulated signals simultaneously on the multiple carriers. Each modulated signal may be a Code Division Multiple Access (CDMA) signal, Time Division Multiple Access (TDMA) signal, Frequency Division Multiple Access (FDMA) signal, Orthogonal FDMA (OFDMA) signal, Single-Carrier FDMA (SC-FDMA) signal, etc. Each modulated signal may be sent on a different carrier and may carry control information (e.g., pilot signals), overhead information, data, etc. The cellular network 130 may be a multi-carrier Long Term Evolution (LTE) network capable of efficiently allocating network resources.

The base stations 105 may wirelessly communicate with the UEs 115 via respective base station antennas. The base stations 105 may be configured to communicate with the UEs 115 under the control of the controller 120 via multiple carriers. Each of the base stations 105 may provide communication coverage for a respective geographic area. In some embodiments, a base station 105 may be referred to as a NodeB, eNodeB, Home NodeB, and/or Home eNodeB. The coverage area for each base station 105 is identified as 110-a, 110-b, or 110-c. The coverage area for a base station may be divided into sectors (not shown, but making up only a portion of the coverage area). The base stations 105 may operate synchronously (i.e., in accordance with a common timing) or asynchronously (i.e., in accordance with independent timings). The system 100 may include base stations 105 of different types (e.g., macro, micro, femto, and/or pico base stations).

When a UE 115 is within range of a base station 105, the UE 115 and base station 105 may communicate using transmissions 135. The transmissions 135 may include uplink and/or reverse link transmission, from a UE 115 to a base station 105, and/or downlink and/or forward link transmissions, from a base station 105 to a UE 115.

The WAPs 140 allow those of the UEs 115 that are capable of communicating via a WLAN 155 to wirelessly access an access network 145. The access network 145 may be connected to the core network 125 and thereby provide access to the core network 125; or in some embodiments, the WAPs 140 may directly access the core network 125. In certain examples, multiple WAPs 140 may provide access to the same access network 145 or core network 125. Additionally or alternatively, different WAPs 140 may provide access to different access networks or core networks (or more generally, to other types of packet data networks).

The WAPs 140 may wirelessly communicate with the UEs 115 via respective WAP antennas and may support operation on multiple carriers. In some embodiments, the WAPs 140 may communicate with the UEs 115 using a version of the IEEE 802.11 standards maintained by the Institute of Electrical and Electronics Engineers, and/or another radio technology related to WLANs. Each of the WAPs 140 may provide communication coverage for a respective geographic area. The coverage area for each WAP 140 is identified as 150-a, 150-b, or 150-c.

When a UE 115 is within range of a WAP 140, the UE 115 and WAP 140 may communicate using transmissions 160. The transmissions 160 may include transmissions from a UE 115 to a WAP 140 and/or transmissions from a WAP 140 to a UE 115.

Some WAPs 140, such as WAP 140-a, may also communicate with components of the cellular network 130. For example, the WAP 140-a is shown to communicate with a base station 105 via transmissions 135, and with a UE 115-a via transmissions 160. Other WAPs 140, such as WAP 140-b, may not communicate via the cellular network 130.

While the base station coverage areas 110 are shown to be substantially uniform across the cellular network 130, and the WAP coverage areas 150 are shown to be substantially uniform across the WLAN 155, the sizes of different coverage areas 110 and different coverage areas 150 may vary based on a number of factors, including the transmission powers of different base stations 105 and WAPs 140, the sizes and types of antennas associated with different base stations 105 and WAPs 140, the geographical characteristics of the locations of different base stations 105 and WAPs 140, and other factors. In certain examples, the coverage areas of different base stations 105 and/or WAPs 140 may overlap. It should be further understood that while the sizes and shapes of the coverage areas 110, 150 are generalized for all UEs 115 for the sake of clarity, the sizes and shapes of the coverage areas 110, 150 as seen from the perspective of different UEs 115 may vary.

Each UE 115 may be capable of associating with one or more base stations 105 or WAPs 140 within range of the UE 115. As shown in FIG. 1, different base stations 105 or WAPs 140 may be within range of a UE 115 as the UE 115 is moved within and outside of the system 100. For example, UE 115-a may be within the coverage area 110-c of a base station 105 and within the coverage area 150-a of a WAP 140. However, as the UE 115-a is moved within or outside of the system 100, the UE 115-a may at times be within the coverage areas of different base stations 105 and/or WAPs 140, or within the coverage area of no base station 105 or WAP 140. A UE 115 may or may not associate with a base station 105 or WAP 140 that provides coverage for the UE 115. Alternately, a UE 115 may associate with two or more base stations 105 and/or WAPs 140 simultaneously.

For a UE 115 capable of communicating via both WLAN and non-WLAN radio technologies, the time and power required to discover and establish communication with the different radio technologies may vary significantly. For example, the time and power required for the UE 115 to discover and establish communication with a cellular network 130 may be orders of magnitude smaller than the time and power required to discover and establish communication with a WLAN 155. This is due to the inherent design of cellular systems and their support of efficient cell search, the tight synchronization that exists between cellular network components, and the need for UEs to scan for WLAN beacons of unknown identity and timing before synchronizing and establishing communication with a WLAN 155. Traditional forms of passive and active beacon scanning are time and power intensive. Discovering and establishing communication via certain radio technologies, such as a WLAN radio technology, can therefore be undesirable in terms of a user's experience—and often most notably in terms of diminished stand-by power (battery life) of the user's UE 115.

Figure 2:
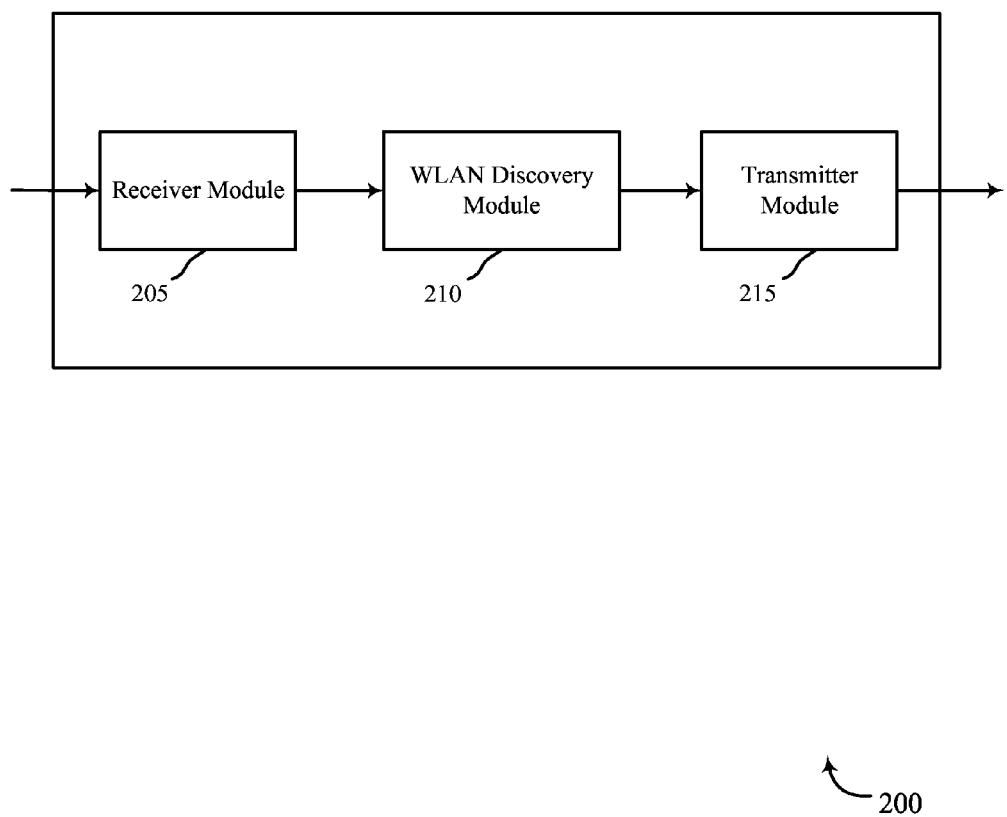
FIG. 2 shows a block diagram illustrating a device for assisting WLAN discovery in accordance with various embodiments.

Referring now to FIG. 2, a block diagram illustrates a device 200 that may assist discovery of a WLAN, and enable more efficient discovery of a WLAN, in accordance with various embodiments. The device 200 may be an example of one or more aspects of WAPs 140, base stations 105, and/or UEs 115 described with reference to FIG. 1. The device 200 may also be a processor. The device 200 may include a receiver module 205, a WLAN discovery module 210, and/or a transmitter module 215. Each of these components may be in communication with each other.

The components of the device 200 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the device 200 may be an example of a WAP, such as one of the WAPs 140 shown in FIG. 1. In an example of such embodiments, the WLAN discovery module 210 may identify a timing reference originating from a non-WLAN radio technology (a first radio technology). After identifying the timing reference, the WLAN discovery module 210 may broadcast a beacon on a WLAN according to a beacon transmission schedule. The beacon transmission schedule may be based at least in part on the timing reference, and may indicate when a beacon transmission period or transmission time occurs on the WLAN. The beacon transmission schedule may be statically programmed into the device 200 (e.g., at the time of manufacture or purchase). Alternately, the beacon transmission schedule may be locally generated by the device 200, or received by the device 200 from another source, such as one of the base stations 105, the controller 120, the core network 125, or the access network 145 shown in FIG. 1. The WLAN (a second radio technology) may be one of the WLANs 155 shown in FIG. 1.

The beacon may be broadcast via the transmitter module 215, and may ultimately be received by one or more UEs such as the UEs 115 of FIG. 1. In this manner, UEs capable of communicating via WLAN and non-WLAN radio technologies may employ the non-WLAN radio technology to receive a timing reference also provided to one or more UEs 115, thereby enabling the UEs 115 to, in some cases, receive the timing reference independently of the WAP 140 or WLAN 155, and in some cases receive the timing reference before a UE 115 is within range of the WAP 140. When used in conjunction with the beacon transmission schedule, which is based on the timing reference, the UE 115 may determine when, or approximately when, the WAP's beacon will be broadcast. The UE 115 may narrow the time window over which it passively scans for the WAP's beacon. This may increase the efficiency of the passive scan and provide time and power savings to the UE 115.

In other embodiments, the device 200 may be an example of a UE, such as one of the mobile devices 115. In an example of these embodiments, the WLAN discovery module 210 may identify a timing reference originating from a non-WLAN radio technology (a first radio technology) via the receiver module 205. The WLAN discovery module 210 may then wake a WLAN receiver of the receiver module 205 according to a beacon transmission schedule to listen for a beacon on a WLAN such as one of the WLANs 155 shown in FIG. 1. The beacon transmission schedule may be statically programmed in a UE 115 (e.g., at the time of manufacture or purchase), or may be dynamically received from a source such as one of the base stations 105 shown in FIG. 1.

In still other embodiments, the device 200 may be an example of a network system or apparatus, such as a base station 105 or the network controller 120 shown in FIG. 1. In an example of such embodiments, the WLAN discovery module 210 may identify a common timing reference for use by one or more WAPs 140 and one or more UEs 115. The timing reference may be broadcast or otherwise transmitted to the WAP(s) 140 and UE(s) 115 via the transmitter module 215, and may be broadcast or otherwise transmitted using a non-WLAN radio technology, such as the cellular network 130 shown in FIG. 1. The network system or apparatus may, in some embodiments, also broadcast or otherwise transmit a beacon transmission schedule to the one or more WAPs 140 and one or more UEs 115. The beacon transmission schedule may be based at least in part on the timing reference. In this manner, the network system or apparatus may enable a UE 115 to narrow the time window over which the UE passively scans for a WAP's beacon. Optionally, the network system or apparatus may employ the receiver module 205 to receive information that assists it in identifying the timing reference or determining the beacon transmission schedule.

Figure 3:
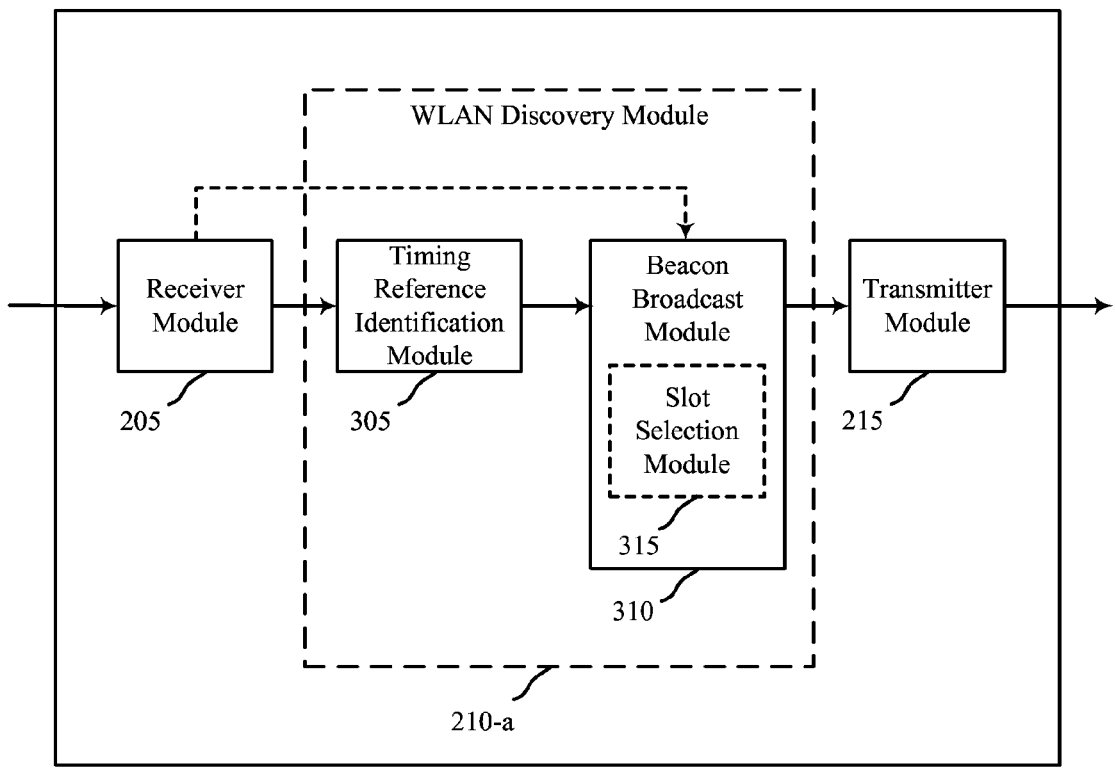
FIG. 3 shows a block diagram illustrating another device for assisting WLAN discovery in accordance with various embodiments.

Turning now to FIG. 3, a block diagram illustrates a device 300, such as a WAP, for assisting WLAN discovery in accordance with various embodiments. The device 300 may be an example of a WAP 140 described with reference to FIG. 1 or a device 200 described with reference to FIG. 2. The device 300 may also be a processor. The device 300 may include a receiver module 205, a WLAN discovery module 210-a, and/or a transmitter module 215. Each of these components may be in communication with each other.

The components of the device 300 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The WLAN discovery module 210-a may include a timing reference identification module 305 and a beacon broadcast module 310. The timing reference identification module 305 may identify a timing reference originating from a non-WLAN radio technology (e.g., a cellular network or a satellite network). In some cases, the timing reference may be or include timing information, signals or messages received via the receiver module 205. The information, signals or messages may provide an explicit or implicit timing reference. In the latter case, and by way of example, usable timing information may be computed, interpreted or derived. In an LTE embodiment, the timing reference may be the timing of a signaling frame such as a superframe boundary (i.e., a type of cellular timing) combined with a superframe number (SFN). The timing reference may also, and in some cases, be received from a back-end server or from a UE 115 on the WLAN. When received from a back-end server, the timing reference may in some cases be received according to a network time protocol (NTP).

When the timing reference is received via the receiver module 205, it may be received in conjunction with a propagation delay not experienced by its source (e.g., an eNB 105 or satellite). It may also be received in conjunction with a propagation delay that differs from the propagation delay experienced by other WAPs and/or UEs 115 receiving the timing reference. As a result, the timing reference identification module 305 may, in some embodiments, synchronize a received timing reference with the timing reference's source (e.g., an eNB 105 or satellite). Synchronization may include, for example, advancing the timing reference by the amount of a propagation delay between its source and a component of the WAP (e.g., the receiver module 205).

The propagation delay may be obtained, for instance, from a LTE Random Access Channel Response, and more particularly, from the Timing Advance information element of the LTE Random Access Channel Response. In other embodiments, and by way of further example, the propagation delay may be estimated by the physical layer of the receiver module 205.

In other embodiments, the WAP may forego synchronization with the source of the timing reference, and instead synchronize transmission of a beacon to a local reception time of the timing reference. These embodiments may be useful when the UEs 115 served by a WAP are physically close to the WAP, such that their timing reference reception times are close to the WAP's timing reference reception time.

When more than one timing reference is available to a WAP (e.g., from an eNB1, eNB2 and eNB3), the WAP may select a timing reference to synchronize to based on, for example, which timing reference source provides the strongest signal in terms of received pilot power or pilot quality (e.g., signal to noise ratio). Alternatively, the WAP may select the timing reference source according to a rank of a source identifier, such as a cell identity. The WAP may then synchronize, for example, with the source of lowest rank.

In some cases, the timing reference may be received or sampled at a particular point in time, upon the occurrence of one or more events, or at regular but infrequent points in time. The events upon which the timing reference is received or sampled may include power on or boot events. In other cases, the timing reference may be received or sampled continuously or at frequent intervals. Regardless, the timing reference may be used to set or adjust a local clock, counter or other local timing element of the device 300.

The beacon broadcast module 310 may receive the timing reference identified by the timing reference identification module 305, or timing information based on the timing reference, and may broadcast a beacon on a WLAN according to a beacon transmission schedule. The beacon transmission schedule may be based at least in part on the timing reference, and may indicate when a beacon transmission period or transmission time occurs on the WLAN. For example, in an LTE embodiment where the timing reference is the timing of a superframe boundary combined with a SFN, the start of a beacon transmission period may be tied to the start of the SFN (e.g., the beacon transmission period may start each time the SFN modulo 20 is equal to zero).

The beacon transmission schedule may be statically programmed into the device 300 (e.g., at the time of manufacture or purchase). Alternately, the beacon transmission schedule may be locally generated by the device 300, or received by the device 300 from another source, such as one of the base stations 105, the core network 125, or the access network 145 shown in FIG. 1. The source may in some cases be a source including the non-WLAN radio technology. In one embodiment, the beacon transmission schedule may be received via the receiver module 205. The beacon may be transmitted via the transmitter module 215, and in some embodiments, may be transmitted over a WLAN such as one of the WLANs 155 shown in FIG. 1.

When the device 300 is capable of transmitting data on multiple channels of operation of the WLAN, the beacon transmission schedule may define beacon transmission periods for any one or more of the channels of operation of the WLAN. In some cases, the beacon transmission schedule may offset the beacon transmission period of each channel from the beacon transmission periods of other channels. By offsetting the beacon transmission periods of different channels of operation, but keeping the beacon transmission periods adjacent or nearly adjacent in time, a UE may be able to sequentially receive a plurality of beacons corresponding to different channels, beacon overlap may be avoided, and wake up of the UE's WLAN receiver may be managed to provide better power saving (e.g., to extend the battery life of a UE). The amount of offset may be selected based on, at least, a time to tune a WLAN transmitter of a WAP or a WLAN receiver of the UE from a first channel to a second channel.

The beacon broadcast module 310 may optionally include a slot selection module 315. The slot selection module 315 may be used to mitigate the chance that two WAPs broadcast their beacons at substantially the same time. When WAPs broadcast their beacons at the same time, the beacons may collide and UEs may be unable to decode the beacons. To avoid overlap, two or more WAPs that are in proximity to one another may be configured to broadcast their beacons based on the same timing reference, beacon transmission schedule and beacon transmission period, but in different time slots within the beacon transmission period. The slot selection module 315 may select one of a plurality of time slots within the beacon transmission period to broadcast a beacon. In some examples, the slot selection module 315 may perform a hash function on a media access control (MAC) address of the device 300 and may select a time slot based on the hashed MAC address. The greater the number of time slots, the greater the likelihood may be that the MAC addresses of any two devices will hash to different time slots and provide time-staggered beacons. However, a relatively few number of time slots may increase the likelihood that beacons of different WAPs are sent in quick succession.

In some cases, the beacon transmission schedule may also be transmitted via the transmitter module 215. The beacon transmission schedule may in some cases be broadcast on the WLAN. In other cases, the beacon transmission schedule may be broadcast to one or more UEs using a non-WLAN radio technology, such as the non-WLAN radio technology from which the timing reference originates. In some embodiments, the beacon transmission schedule may be inserted in an information element (IE) broadcast over a control channel of a cellular network, such as a system IE broadcast over a Broadcast Control Channel (BCCH) of an LTE or Global System for Mobile Communications (GSM) cellular network.

In some embodiments, the device 300 may include components operating in accord with a single radio technology (e.g., a WLAN radio technology), and the timing reference originating from a non-WLAN radio technology may be converted to a form suitable for receipt and/or identification by the WLAN radio technology. In other embodiments, the device may include components operating in accord with first and second radio technologies, as will be described in more detail with reference to FIG. 4.

Figure 4:
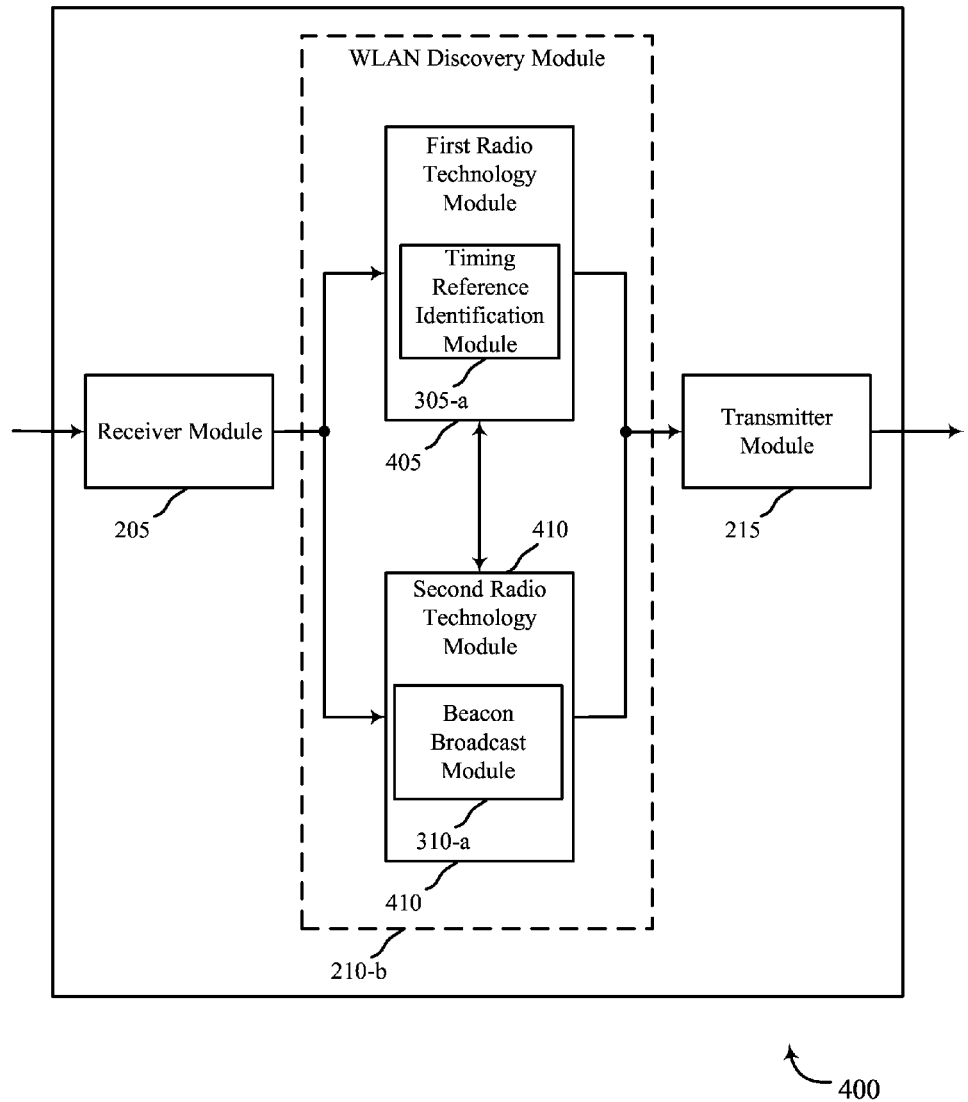
FIG. 4 shows a block diagram illustrating yet another device for assisting WLAN discovery in accordance with various embodiments.

Turning now to FIG. 4, a block diagram illustrates a device 400, such as a WAP, for assisting WLAN discovery in accordance with various embodiments. The device 400 may be an example of a WAP 140 described with reference to FIG. 1 and/or a device 200, 300 described with reference to FIGS. 2 and/or 3. The device 400 may also be a processor. The device 400 may include a receiver module 205, a WLAN discovery module 210-*b*, and/or a transmitter module 215. Each of these components may be in communication with each other.

The components of the device 400 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The WLAN discovery module 210-*b* may include a first radio technology module 405 and a second radio technology module 410. The first radio technology module 405 may include components operating in accord with a non-WLAN radio technology, such as a cellular network or a satellite network (e.g., a GPS). In some cases, the first radio technology module 405 may include some or all of the components of a femtocell. The second radio technology module 410 may include components operating in accord with a WLAN radio technology.

The first radio technology module 405 may include a timing reference identification module 305-*a* that identifies a timing reference originating from a non-WLAN radio technology such as a cellular network or a satellite network. The timing reference identification module 305-*a* may in some cases be configured similarly to the timing reference identification module 305 shown in FIG. 3. The second radio technology module 410 may include a beacon broadcast module 310-*a* that broadcasts a beacon on a WLAN according to a beacon transmission schedule. The beacon transmission schedule may be based at least in part on the timing reference identified by the timing reference identification module 305-*a*. The beacon transmission module 310-*a* may in some cases be configured similarly to the beacon transmission module 310 shown in FIG. 3.

In some embodiments, the first and second radio technology modules 405, 410 may generate and exchange signaling messages. Signaling messages may be generated and exchanged, for example, to provide a timing reference identified by the first radio technology module 405 to the second radio technology module 410, or to synchronize the first and second radio technology modules 405, 410 based at least in part on the timing reference.

Figure 5:
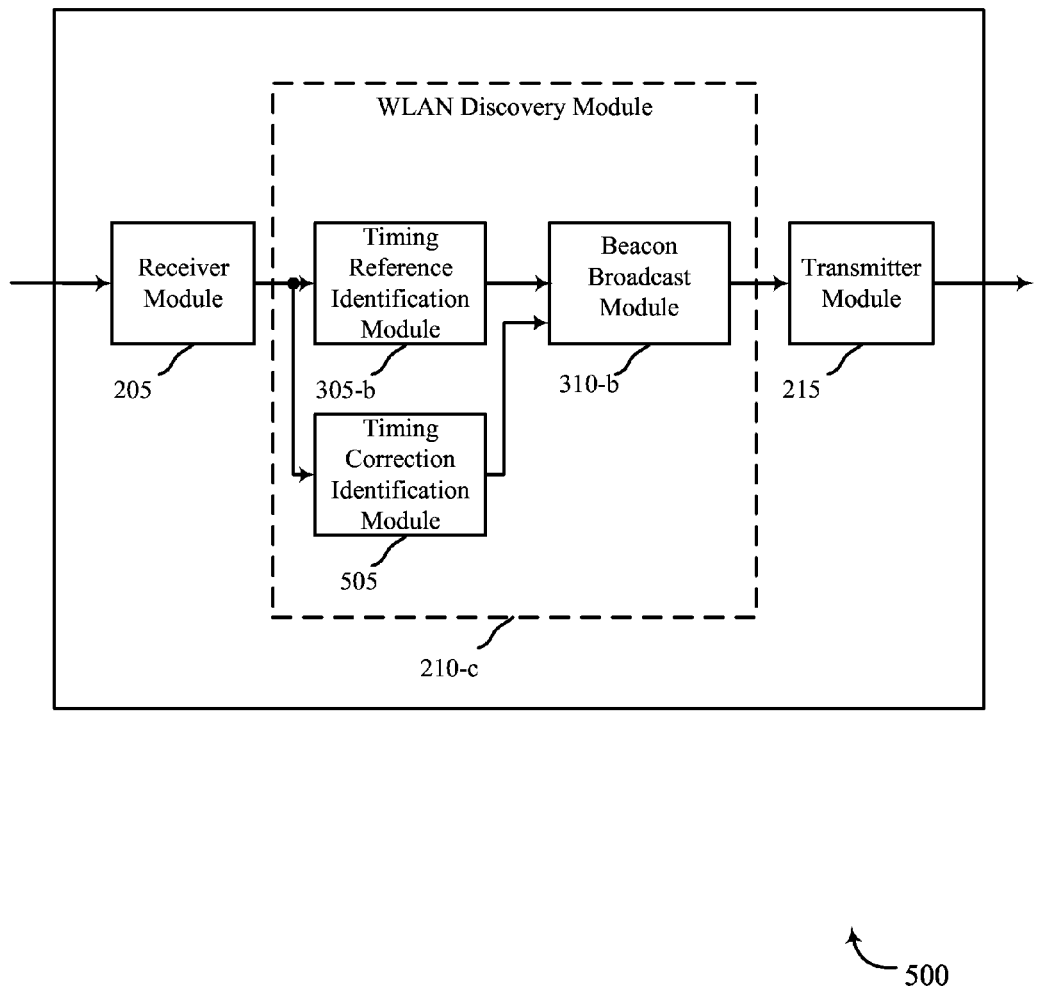
FIG. 5 shows a block diagram illustrating still another device for assisting WLAN discovery in accordance with various embodiments.

Turning now to FIG. 5, a block diagram illustrates a device 500, such as a WAP, for assisting WLAN discovery in accordance with various embodiments. The device 500 may be an example of a WAP 140 described with reference to FIG. 1 or a device 200 described with reference to FIG. 2, and in some cases may have components similar to those described with reference to FIG. 3 or FIG. 4. The device 500 may also be a processor. The device 500 may include a receiver module 205, a WLAN discovery module 210-*c*, and/or a transmitter module 215. Each of these components may be in communication with each other.

The components of the device 500 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The WLAN discovery module 210-*c* may include a timing reference identification module 305-*b*, a beacon broadcast module 310-*b*, and a timing correction identification module 505. The timing reference identification module 305-*b* may identify a timing reference originating from a non-WLAN radio technology such as a cellular network or a satellite network, and may in some cases be configured similarly to the timing reference identification module 305 shown in FIG. 3 or the timing reference identification module 305-*a* shown in FIG. 4. The beacon broadcast module 310-*b* may broadcast a beacon on a WLAN according to a beacon transmission schedule. The beacon transmission schedule may be based at least in part on the timing reference identified by the timing reference identification module 305-*b*. The beacon transmission module 310-*b* may in some cases be configured similarly to the beacon transmission module 310 shown in FIG. 3 or the beacon transmission module 310-*a* shown in FIG. 4.

The timing correction identification module 505 may receive a beacon timing correction from a UE, base station or other device, such as one of the UEs 115, base stations 105 or other devices shown in FIG. 1. The beacon timing correction may indicate, for example, a timing difference between i) a beacon transmission time indicated by the beacon timing reference and the beacon transmission schedule, and ii) a beacon receipt time or times (e.g., an average receipt time) recorded by one or more UEs 115. The beacon timing correction may in some cases be received in a message, which message may be received by the receiver module 205. The timing correction identification module 505 may provide the identified beacon timing correction to the beacon broadcast module 310-*b*, which may in turn broadcast a beacon according to the beacon timing correction (e.g., by accelerating or retarding the beacon transmission time). By broadcasting a beacon in accordance with the beacon timing correction, the device 500 may account for skew or other timing irregularities in the timing reference, or delays inherent in the circuitry or processes of the device 500.

Figure 6:
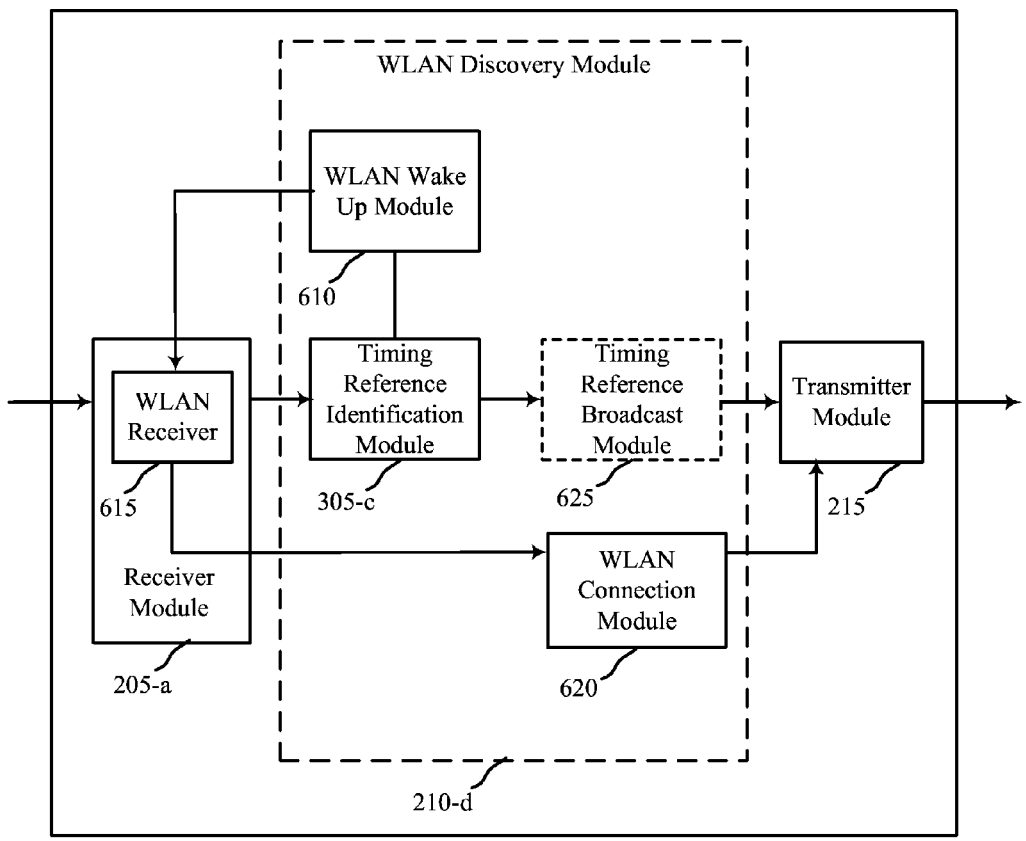
FIG. 6 shows a block diagram illustrating another device for assisting WLAN discovery in accordance with various embodiments.

Turning now to FIG. 6, a block diagram illustrates a device 600, such as a UE, for assisting WLAN discovery in accordance with various embodiments. The device 600 may be an example of a UE 115 described with reference to FIG. 1 or a device 200 described with reference to FIG. 2. The device 600 may also include components similar to the components described with reference to the devices 300, 400, and/or 500 of FIGS. 3, 4, and/or 5. The device 600 may also be a processor. The device 600 may include a receiver module 205-*a*, a WLAN discovery module 210-*d*, and/or a transmitter module 215. Each of these components may be in communication with each other.

The components of the device 600 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The WLAN discovery module 210-*d* may include a timing reference identification module 305-*c*, a WLAN wake up module 610, and a WLAN connection module 620. The timing reference identification module 305-*c* may identify a timing reference originating from a non-WLAN radio technology (e.g., a cellular network or a satellite network). In some cases, the timing reference may be or include timing information, signals or messages received via the receiver module 205-*a*. The information, signals or messages may provide an explicit or implicit timing reference. In the latter case, and by way of example, usable timing information may need to be computed, interpreted or derived. In an LTE embodiment, the timing reference may be the timing of a signaling frame such as a superframe boundary (i.e., a type of cellular timing) combined with a SFN.

When the timing reference is received via the receiver module 205-*a*, it may be received in conjunction with a propagation delay not experienced by its source (e.g., an eNB 105 or satellite). It may also be received in conjunction with a propagation delay that differs from the propagation delay experienced by other UEs 115 and/or WAPs receiving the timing reference. As a result, the timing reference identification module 305-*c* may, in some embodiments, synchronize a received timing reference with the timing reference's source (e.g., an eNB 105 or satellite). Synchronization may include, for example, advancing the timing reference by the amount of a propagation delay between its source and a component of the WAP (e.g., the receiver module 205-*a*).

The propagation delay may be obtained, for instance, from a LTE Random Access Channel Response, and more particularly, from the Timing Advance information element of the LTE Random Access Channel Response. In other embodiments, and by way of further example, the propagation delay may be estimated by the physical layer of the receiver module 205-*a*.

In other embodiments, a UE 115 may forego synchronization with the source of the timing reference, and instead synchronize receipt of a beacon to a local reception time of the timing reference. These embodiments may be useful when a UE 115 is physically close to a WAP, such that its timing reference reception times are close to the WAP's timing reference reception time.

When more than one timing reference is available to a UE 115 (e.g., from an eNB1, eNB2 and eNB3), the UE 115 may select a timing reference to synchronize to based on, for example, which timing reference source provides the strongest signal in terms of received pilot power or pilot quality (e.g., signal to noise ratio). Alternatively, the UE may select the timing reference source according to a rank of a source identifier, such as a cell identity. The UE 115 may then synchronize, for example, with the source of lowest rank.

In some cases, the timing reference may be received or sampled at a particular point in time, upon the occurrence of one or more events, or at regular but infrequent points in time. The events upon which the timing reference is received or sampled may include power on or boot events, or a need to scan for WAPs within range. In other cases, the timing reference may be received or sampled continuously or at frequent intervals. Regardless, the timing reference may be used to set or adjust a local clock, counter or other local timing element of the device 600. In some cases, the timing reference may be transmitted to one or more WAPs (e.g., WAPs in a first or multiple WLANs) via the transmitter module 215.

The WLAN wake up module 610 may receive the timing reference identified by the timing reference identification module 305-*c*, or timing information based on the timing reference, and may wake a WLAN receiver 615 of the receiver module 205-*a* according to a beacon transmission schedule. The beacon transmission schedule may be based at least in part on the timing reference, and may indicate when a beacon transmission period occurs on the WLAN. For example, in an LTE embodiment where the timing reference is the timing of a superframe boundary combined with a SFN, the start of the beacon transmission period may be tied to the start of the SFN (e.g., the beacon transmission period may start each time the SFN modulo 20 is equal to zero).

The beacon transmission schedule may be statically programmed into the device 600 (e.g., at the time of manufacture or purchase). Alternately, the beacon transmission schedule may be received by the device 600 from another source, such as one of the base stations 105, the core network 125, or the access network 145 shown in FIG. 1. The source may in some cases be a source comprising the non-WLAN radio technology. In some cases, the beacon transmission schedule may be received via the receiver module 205-*a*.

The WLAN wake up module 610 may wake part or all of the receiver module 205-*a* to listen for a WAP beacon, but may typically wake at least part of the WLAN receiver 615. The WLAN wake up module 610 may return the WLAN receiver 615 to a sleep state following one or more beacon transmission periods defined by the beacon transmission schedule. In some cases, return of the WLAN receiver 615 to the sleep state may be managed by a timer. By way of example, the duration of the timer may be set by the UE 115 or based on information received via the receiver module 205-*a*.

While awake, the WLAN receiver 615 may receive one or more beacons from one or more WAPs. In some cases, the WLAN receiver 615 may receive a beacon from a first WAP in a first WLAN during one or more beacon transmission periods. The WLAN connection module 620 may then establish a connection with the first WAP (e.g., via signaling or communications over the receiver module 205-*a* and transmitter module 215). In other cases, the WLAN receiver 615 may receive beacons from a plurality of WAPs in the first WLAN, or may receive beacons from WAPs in multiple WLANs. The beacons may be received during one or more beacon transmission periods, and in some cases may be received in different slots of a single beacon transmission period. In these cases, the WLAN connection module 620 may determine which of the WAPs to connect to (e.g., based on preference or signal strength) and may establish a connection with a selected one of the WAPs.

In other embodiments, a UE 115 may, upon receiving a beacon from a WAP: deliver the beacon to other modules of the UE 115; indicate the presence of the WAP or WLAN to which the beacon corresponds to a serving network; or indicate the presence of the WAP or WLAN to which the beacon corresponds to a module of a higher layer (e.g., a software module) that may use the identity of the WAP or WLAN for localization.

By way of example, the WLAN receiver 615 may be kept awake for more than one beacon transmission period when the WLAN has more than one channel of operation, and when a beacon transmission period corresponding to one channel of operation of the WLAN (e.g., a first beacon transmission period corresponding to a first channel of operation) is followed by a beacon transmission period for another channel of operation of the WLAN (e.g., a second beacon transmission period corresponding to a second channel of operation). When the second beacon transmission period is offset from the first beacon transmission period by a predetermined offset time, and the beacon transmission periods are adjacent or nearly adjacent in time, the WLAN receiver 615 may be woken in an efficient manner to listen for beacons pertaining to each of the first and second channels of operation of the WLAN, thereby conserving power and extending the battery life of a battery-operated UE. For example, with an offset of five milliseconds (5 ms), the WLAN receiver 615 may be woken at time t=0 ms to listen for beacons related to the first channel of operation, and kept awake through time t=10 ms to listen for beacons related to the second channel of operation.

In some embodiments of the device 600, the timing reference identification module 305-*c* and timing reference broadcast module 625 may be operated in accord with a non-WLAN radio technology such as a cellular network or a satellite network (a first radio technology), and the WLAN wake up module 610 and WLAN connection module 620 may be operated in accord with a WLAN radio technology (a second radio technology).

Figure 7:
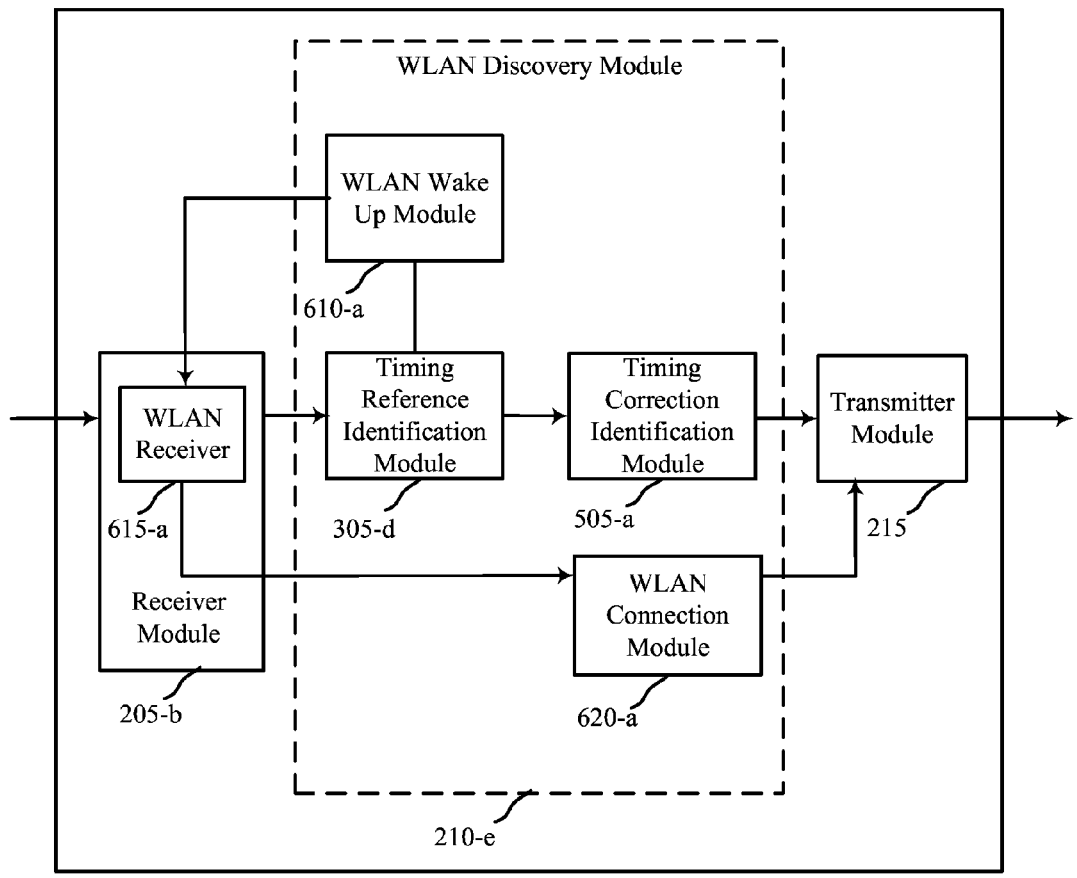
FIG. 7 shows a block diagram illustrating yet another device for assisting WLAN discovery in accordance with various embodiments.

Turning now to FIG. 7, a block diagram illustrates a device 700, such as a UE, for assisting WLAN discovery in accordance with various embodiments. The device 700 may be an example of a UE 115 described with reference to FIG. 1 or a device 200 described with reference to FIG. 2, and in some cases may have components similar to those described with reference the devices 300, 400, 500, and/or 600 of FIGS. 2, 3, 4, 5, and/or 6. The device 700 may also be a processor. The device 700 may include a receiver module 205-*a*, a WLAN discovery module 210-*e*, and/or a transmitter module 215. Each of these components may be in communication with each other.

The components of the device 700 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The WLAN discovery module 210-*e* may include a timing reference identification module 305-*d*, a WLAN wake up module 610-*a*, a WLAN connection module 620-*a*, and a timing correction identification module 505-*a*. The timing reference identification module 305-*d*, WLAN wake up module 610-*a*, and WLAN connection module 620-*a* may in some cases be configured similarly to respective ones of the timing reference identification module 305-*c*, WLAN wake up module 610, and WLAN connection module 620 shown in FIG. 6.

The timing correction identification module 505-*a* may record a beacon receipt time of a beacon received via the WLAN receiver 615-*a* from a first WAP. The timing correction module 505-*a* may then compute a beacon timing correction based on the beacon receipt time and a beacon transmission time indicated by a beacon transmission schedule. In some cases, the beacon timing correction may be a difference of the beacon receipt time and the beacon transmission time indicated by the beacon transmission schedule. The timing correction identification module 505-*a* may then transmit the beacon timing correction via the transmitter module 215. Alternately, the timing correction identification module 505-*a* may compare a magnitude of the beacon timing correction to a threshold, and only transmit the beacon timing correction when the magnitude of the beacon timing correction exceeds the threshold. The beacon timing correction may in some cases be transmitted in a message, which message may be transmitted by the transmitter module 215. The beacon timing correction may ultimately be received and used by the WAP that transmitted the beacon, to account for skew or other timing irregularities in the timing reference received by the WAP, or delays inherent in the circuitry or processes of the WAP.

Figure 8:
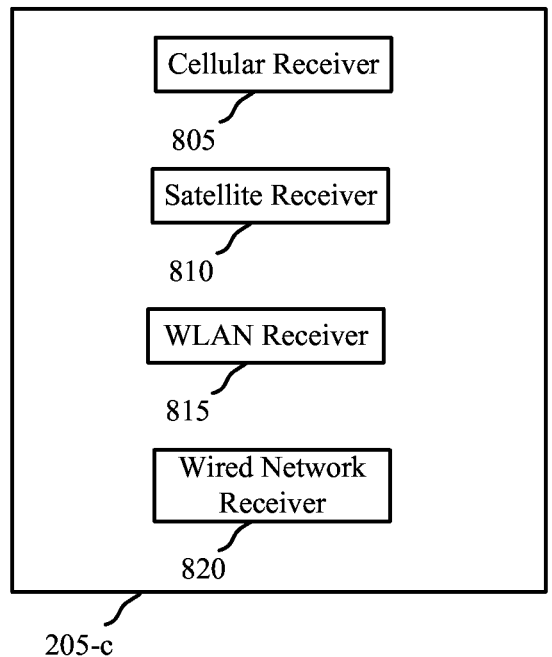
FIG. 8 shows a block diagram of an example of a receiver module.
Figure 9:
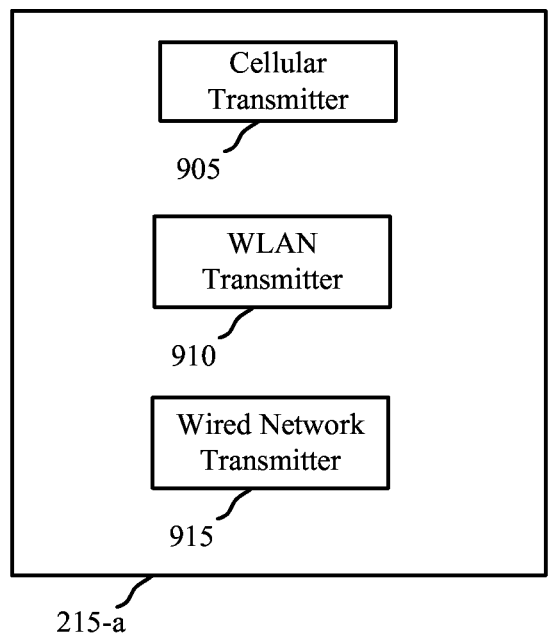
FIG. 9 shows a block diagram of an example of a transmitter module.

FIGS. 8 & 9 illustrate embodiments of the receiver modules 205 and transmitter modules 215 shown in FIGS. 2, 3, 4, 5, 6, and/or 7. More particularly, FIG. 8 illustrates a receiver module 205-*c* including one or more of a cellular receiver 805, a satellite receiver 810, a WLAN receiver 815, and a wired network receiver 820 (e.g., an Internet connection). The receiver module 205-*c* may be an example of the receiver module 205 described in any of FIGS. 2, 3, 4, 5, 6, and/or 7.

The various receivers 805, 810, 815, 820 may be used, for example, to receive a timing reference, a beacon timing correction, or messages regarding same. The cellular receiver 805, satellite receiver 810 or WLAN receiver 815 may also be used for other wireless communications, and the wired network receiver 820 may be used for other wired communications.

Because of the tight synchronization of cellular network components, there are several timing references that may be received from a cellular network via the cellular receiver 805, including a frame timing such as radial frame timing or superframe timing. The synchronization used by a satellite network (e.g., a GPS) may also provide a timing reference. Timing references may also be obtained via the WLAN receiver 815 or wired network receiver 820 (e.g., in terms of a network timing protocol (NTP)). However, the nature of the protocols and transmission channels used in WLANs and wired networks may tend to decrease the accuracy with which a timing reference can be provided. It may, however, be useful in some cases to provide a timing reference over one of these networks if the timing reference is one that originates from a non-WLAN radio technology. Messages, such as a message indicating a beacon transmission schedule, may be received via any of the receivers 805, 810, 815, 820.

FIG. 9 illustrates a transmitter module 215-*a*. The transmitter module 215-*a* may be an example of the transmitter module 215 described with reference to any of FIGS. 2, 3, 4, 5, 6, and/or 7. The transmitter module 215-*a* may include one or more of a cellular transmitter 905, a WLAN transmitter 910, and a wired network transmitter 915 (e.g., an Internet connection). The various transmitters 905, 910, 915 may be used, for example, to broadcast a beacon indicating the presence of a network (in the case of a WAP), or to broadcast a timing reference or beacon transmission schedule.

Figure 10:
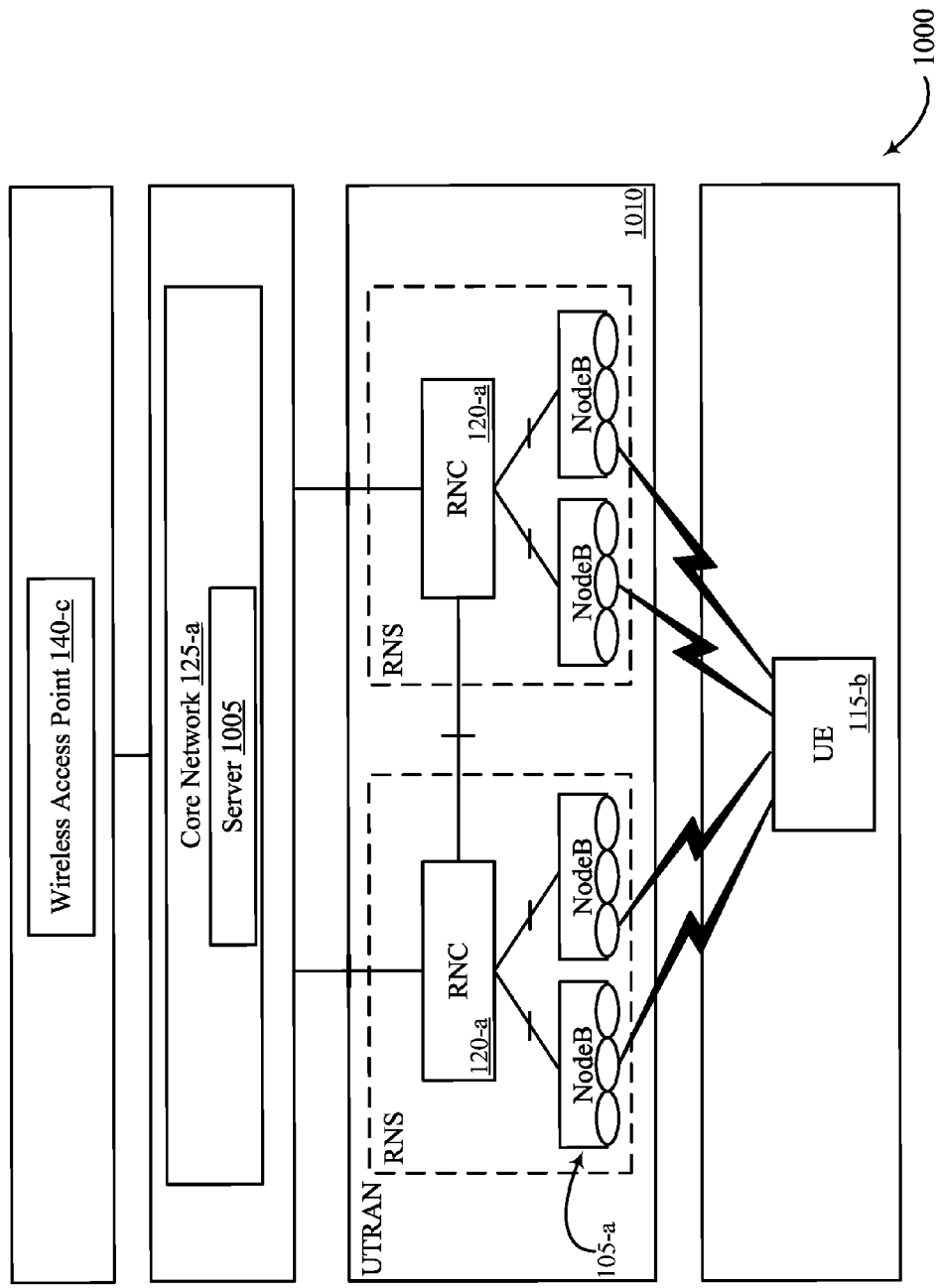
FIG. 10 shows a block diagram of another example of a wireless communications system for assisting discovery of a WLAN.

Referring next to FIG. 10, a block diagram illustrates a wireless communications system 1000 for assisting network discovery in accordance with various embodiments. The system 1000 may be an example of parts of the system 100 described with reference to FIG. 1. NodeBs 105-*a* (a type of base station 105) and radio network controllers (RNCs) 120-*a* (a type of base station controller 120) may be parts of wireless communications system 1000. In the illustrated example, the system may include a Universal Mobile Telecommunications System (UMTS) Terrestrial Radio Access Network (UT-RAN) 1010. A UTRAN 1010 is a collective term for the NodeBs 105-*a* (or base stations) and RNCs 120-*a* (or base station controllers) which make up the UMTS radio access network. This may be a 3 G communications network which is capable of carrying both real-time circuit switched and IP-based packet-switched traffic types. The UTRAN 1010 may provide an air interface access method for the UE 115-*b*, which may be an example of one of the UEs 115 shown in FIG. 1 or one of the devices 200, 600, 700 shown in FIG. 2, 6 or 7. The UTRAN 1010 may also provide an air interface access method for a cellular device such as a femtocell, which femtocell may in some cases be integrated with a WAP 140-*c*. The WAP 140-*c* may be an example of one of the WAPs 140 shown in FIG. 1 or one of the devices 200, 300, 400, 500 shown in FIG. 2, 3, 4 or 5. Connectivity may be provided between the UE 115-*a* and the core network 125-*a* by the UTRAN 1010. The UTRAN 1010 may transport data packets to multiple UEs 115-*b*.

The UTRAN 1010 may be connected internally or externally to other functional entities by a number of interfaces. The UTRAN 1010 may be in communication with a core network 125-*a* via an external interface supported by RNCs 120-*a*. In addition, the RNCs 120-*a* may manage a set of base stations called NodeBs 105-*a*. RNCs 120-*a* may be in communication with each other, as well. The UTRAN 1010 may be largely autonomous from the core network 125-*a* because the RNCs 120-*a* may be interconnected. The NodeBs 105-*a* may be in wireless communication with the UE 115-*b*. The system may be further connected to additional networks (not shown), such as the access network 145 of FIG. 1, a corporate intranet, the Internet, or a conventional public switched telephone network, and may transport data packets between each UE 115-*b* and such outside networks.

Each RNC 120-*a* may fill multiple roles. First, it may control the admission of new UEs 115-*b* or services attempting to use the NodeBs 105-*a*. Second, from the NodeB 105-*a*, or base station, point of view, the RNC 120-*a* may be a controlling RNC 120-*a*. Controlling admission may increase the likelihood that UEs 115-*b* are allocated radio resources (bandwidth and signal/noise ratio) up to what the network has available. An RNC 120-*a* may terminate the UE's 115-*b* control plane communications. For example, a radio connection between the UE 115-*b* and a NodeB 105-*a* may enter a high power state while the UE 115-*b* is in a standby state. The UE 115-*b* may initiate a dormancy procedure upon determining that the count of open transport layer sockets between the UE 115-*b* and a server of a network, such as the Internet, satisfies a threshold. An RNC 120-*a* may execute the dormancy procedure by terminating the radio connection between the UE 115-*b* and the NodeB 105-*a*. The NodeBs 105-*a* and RNC 120-*a* may provide the same functionality for a cellular device incorporated into the WAP 140-*c*.

For an air interface, UMTS often uses a wideband spread-spectrum mobile air interface known as WCDMA. WCDMA uses a direct sequence code division multiple access signaling method (or CDMA) to separate users. WCDMA is a third generation standard for mobile communications. WCDMA evolved from GSM (Global System for Mobile Communications)/GPRS a second generation standard, which is oriented to voice communications with limited data capability. The first commercial deployments of WCDMA are based on a version of the standards called WCDMA Release 99.

The core network 125-*a* may include a server 1005 for communicating with the WAP 140-*c*. In this manner, the server 1005 and WAP 140-*c* may exchange timing information and other signals (e.g., the server 1005 may provide a timing reference, beacon transmission schedule or beacon timing correction to the WAP 140-*c*, or the WAP 140-*c* may provide a beacon transmission schedule to the server 1005). The connection between the server 1005 and the WAP 140-*c* may in some examples be or include a wireless network connection (e.g., a connection provided over a WLAN) or a wired network connection, and in some cases may be or include an Internet connection. If the WAP 140-*c* is integrated or associated with a cellular device, timing information and other signals may also be exchanged between one or more of the NodeBs 105-*a* and the cellular device integrated or associated with the WAP 140-*c*.

When timing information indicative of when a WAP will broadcast its beacon is received by the core network 125-*a* or UTRAN 1010 (assuming, in the latter case, that the WAP 140-*c* is integrated or associated with a cellular device), the timing information may be broadcast to UEs 115-*b*, thereby enabling the UEs 115-*b* to perform more efficient passive scans for WAP beacons. A timing reference or other timing information may also be generated by the UTRAN 1010 and broadcast to the UEs 115-*b*.

Figure 11:
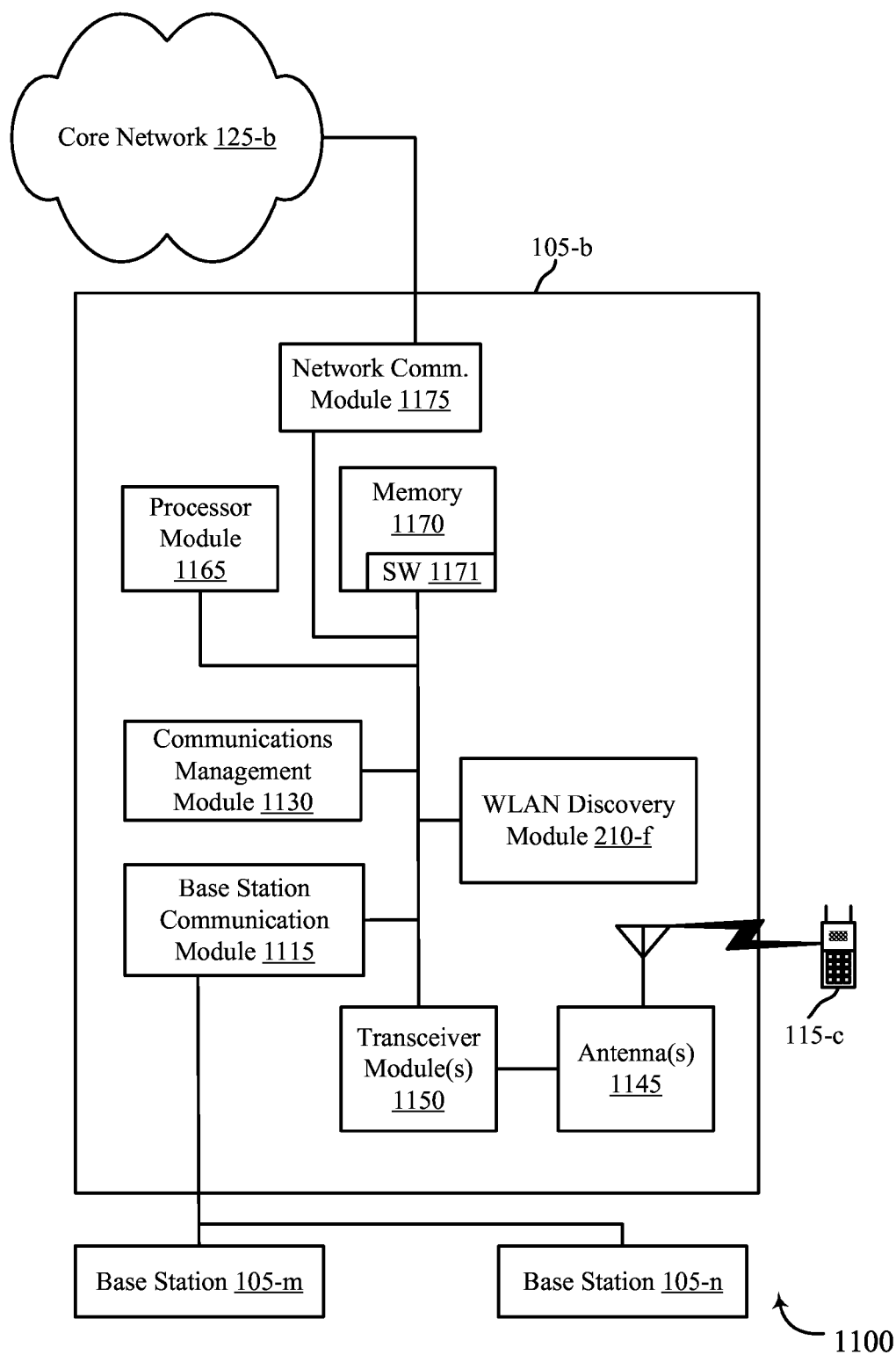
FIG. 11 shows a block diagram of yet another example of a wireless communications system for assisting discovery of a WLAN.

Referring now to FIG. 11, a block diagram illustrates a communications system 1100 for assisting WLAN discovery in accordance with various embodiments. The system 1100 may be an example of aspects of the system 100 depicted in FIG. 1 or the system 1000 depicted in FIG. 10. The system 1100 may include a base station 105-*b*, which may be one of the base stations 105 (or eNodeBs) of FIGS. 1 and/or 10. The base station 105-*b* may include antenna(s) 1145, transceiver module(s) 1150, memory 1170, and a processor module 1165, which each may be in communication, directly or indirectly, with each other (e.g., over one or more buses). The transceiver module 1150 may be configured to communicate bi-directionally, via the antenna(s) 1145, with the UE 115-*c*, which may be a multi-mode mobile device. The transceiver module 1150 (and/or other components of the base station 105-*b*) may also be configured to communicate bi-directionally with one or more networks. In some cases, the base station 105-*b* may communicate with the core network 125-*b* through network communications module 1175. Base station 105-*b* may be an example of an eNodeB base station, a Home eNodeB base station, a NodeB base station, and/or a Home NodeB base station. A controller (not shown) may be integrated into base station 105-*b* in some cases, such as with an eNodeB base station.

Base station 105-*b* may also communicate with other base stations 105, such as base station 105-*m* and base station 105-*n*. Each of the base stations 105 may communicate with UE 115-*c* using different wireless communications technologies, such as different radio access technologies. In some cases, base station 105-*b* may communicate with other base stations such as 105-*m* and/or 105-*n* utilizing base station communication module 1115. In some embodiments, base station 105-*b* may communicate with other base stations through the core network 125-*b*.

The memory 1170 may include random access memory (RAM) and read-only memory (ROM). The memory 1170 may also store computer-readable, computer-executable software code 1171 containing instructions that are configured to, when executed, cause the processor module 1165 to perform various functions. Alternatively, the software 1171 may not be directly executable by the processor module 1165 but be configured to cause the computer, e.g., when compiled and executed, to perform functions described herein.

The processor module 1165 may include an intelligent hardware device, e.g., a central processing unit (CPU) such as those made by Intel® Corporation or AMD®, a microcontroller, an application-specific integrated circuit (ASIC), etc. The processor module 1165 may include a speech encoder (not shown) configured to receive audio via a microphone, convert the audio into packets (e.g., 30 ms in length) representative of the received audio, provide the audio packets to the transceiver module 1150, and provide indications of whether a user is speaking. Alternatively, an encoder may only provide packets to the transceiver module 1150, with the provision or withholding/suppression of the packet itself providing the indication of whether a user is speaking.

The transceiver module 1150 may include a modem configured to modulate the packets and provide the modulated packets to the antennas 1145 for transmission, and to demodulate packets received from the antennas 1145. While some examples of the base station 105-*b* may include a single antenna 1145, the base station 105-*b* preferably includes multiple antennas 1145 for multiple links which may support carrier aggregation. For example, one or more links may be used to support macro communications with mobile device 115-*a*.

According to the system of FIG. 11, the base station 105-*b* may further include a communications management module 1130. The communications management module 1130 may manage communications with other base stations 105. By way of example, the communications management module 1130 may be a component of the base station 105-*b* in communication with some or all of the other components of the base station 105-*b* via a bus. Alternatively, functionality of the communications management module 1130 may be implemented as a component of the transceiver module 1150, as a computer program product, and/or as one or more controller elements of the processor module 1165.

In some embodiments, the WLAN discovery module 210-*f*, in conjunction with the transceiver module 1150, the antenna(s) 1145 and other possible components of base station 105-*b*, may transmit or receive timing information to/from the UE 115-*c*, to other base stations 105-*m*/105-*n*, or to core network 125-*b*. For example, in some embodiments, the transceiver module 1150 in conjunction with antennas 1145, along with other possible components of base station 105-*b*, may transmit or broadcast a timing reference or beacon transmission schedule to the UE 115-*c*. The timing reference and beacon transmission schedule may enable the UE 115-*c* to synchronize its receipt of WAP beacons with WAP beacon transmission, thereby reducing the time and power used by the UE 115-*c* to passively or actively scan for beacons of unknown timing transmitted over a WLAN. The base station 105-*b* may in some cases communicate timing information to the UE 115-*c* using, for example, a control channel (e.g., BCCH) within the LTE wireless communication technology. Similarly, the base station 105-*b* may receive timing information, such as a beacon timing correction, from the UE 115-*c*.

In some embodiments, the WLAN discovery module 210-*f*, in conjunction with the transceiver module 1150, the antenna(s) 1145 and other possible components of base station 105-*b* may transmit or receive timing information (e.g., a timing reference, a beacon transmission schedule or a beacon timing correction) to/from a cellular device of a WAP 140, which WAP may be one of the WAPs 140 shown in FIG. 1 or one of the devices 200, 300, 400, 500 shown in FIG. 2, 3, 4 or 5.

Figure 12:
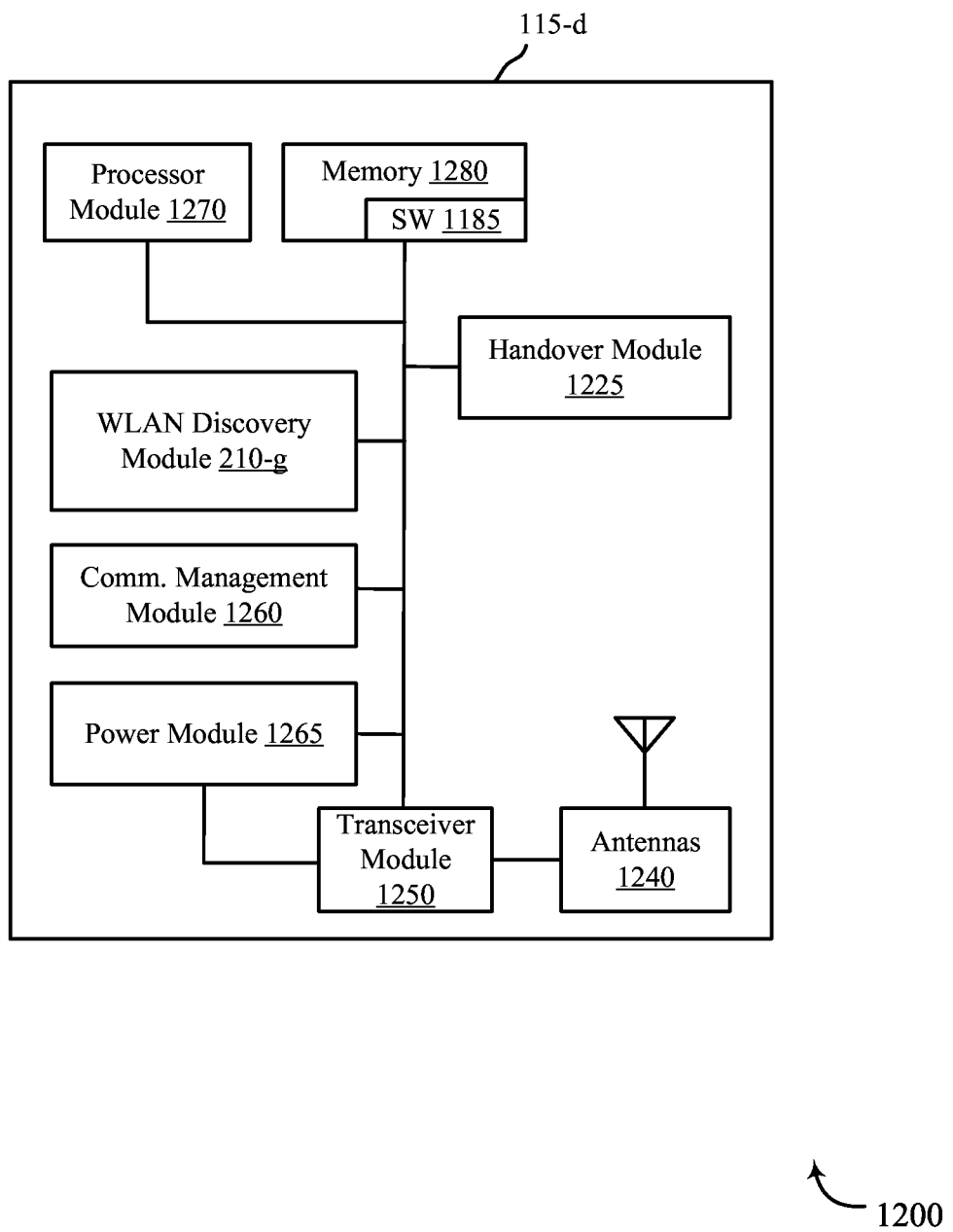
FIG. 12 shows a block diagram of an example UE for assisting discovery of a WLAN.

Turning now to FIG. 12, a block diagram 1200 illustrates a UE 115-*d* for assisting WLAN discovery in accordance with various embodiments. The UE 115-*d* may have any of various configurations, such as personal computers (e.g., laptop computers, netbook computers, tablet computers, etc.), cellular telephones, PDAs, digital video recorders (DVRs), internet appliances, gaming consoles, e-readers, etc. The UE 115-*d* may have an internal power supply (not shown), such as a small battery, to facilitate mobile operation. In some embodiments, the UE 115-*d* may be an example of one of the UEs 115 shown in FIGS. 1 and/or 10, or one of the devices 600, 700 shown in FIG. 6 or FIG. 7. The UE 115-*d* may be a multi-mode mobile device.

The UE 115-*d* may include antennas 1240, a transceiver module 1250, memory 1280, and a processor module 1270, which each may be in communication, directly or indirectly, with each other (e.g., via one or more buses). The transceiver module 1250 may be configured to communicate bi-directionally, via the antennas 1240 and/or one or more wired or wireless links, with one or more networks, as described above. For example, the transceiver module 1250 may be configured to communicate bi-directionally with base stations 105 of FIG. 1, FIG. 10 and/or FIG. 11. The transceiver module 1250 may include a modem configured to modulate the packets and provide the modulated packets to the antennas 1240 for transmission, and to demodulate packets received from the antennas 1240. While the UE 115-*d* may include a single antenna, the UE 115-*d* will typically include multiple antennas 1240 for multiple links.

The memory 1280 may include random access memory (RAM) and read-only memory (ROM). The memory 1280 may store computer-readable, computer-executable software code 1285 containing instructions that are configured to, when executed, cause the processor module 1270 to perform various functions. Alternatively, the software code 1285 may not be directly executable by the processor module 1270 but be configured to cause the computer (e.g., when compiled and executed) to perform functions described herein.

The processor module 1270 may include an intelligent hardware device, e.g., a central processing unit (CPU) such as those made by Intel® Corporation or AMD®, a microcontroller, an application-specific integrated circuit (ASIC), etc. The processor module 1270 may include a speech encoder (not shown) configured to receive audio via a microphone, convert the audio into packets (e.g., 30 ms in length) representative of the received audio, provide the audio packets to the transceiver module 1250, and provide indications of whether a user is speaking. Alternatively, an encoder may only provide packets to the transceiver module 1250, with the provision or withholding/suppression of the packet itself providing the indication of whether a user is speaking.

According to the architecture of FIG. 12, the UE 115-*d* may further include a communications management module 1260. The communications management module 1260 may manage communications with other UEs 115. By way of example, the communications management module 1260 may be a component of the UE 115-*d* in communication with some or all of the other components of the UE 115-*d* via a bus. Alternatively, functionality of the communications management module 1260 may be implemented as a component of the transceiver module 1250, as a computer program product, and/or as one or more controller elements of the processor module 1270.

In some embodiments, a handover module 1225 may be utilized to perform reselection and handover procedures of the UE 115-*d* from one base station to another. For example, the handover module 1225 may perform a handover procedure of the UE 115-*d* from signaling carrier to another signaling carrier, a traffic carrier to another traffic carrier and between a signaling and traffic carrier.

In some embodiments, the WLAN discovery module 210-*g*, in conjunction with the transceiver module 1250, the antennas 1240 and other possible components of UE 115-*d*, may receive timing information such as a timing reference or beacon transmission schedule from a base station 105 of FIG.

1, FIG. 10, and/or FIG. 11. The timing information may assist the UE 115-*d* and the WLAN discovery module 210-*g* in determining when a WAP is due to transmit its beacon, so that the WLAN discovery module 210-*g* may implement efficient passive scanning for WAP beacons and wake a WLAN receiver within the transceiver module 1250 over a shorter scanning window, thereby using less of the power provided by the UE's power module 1265 (e.g., a battery).

In some cases, the WLAN discovery module 210-*g* may receive an access point beacon via the WLAN receiver of the transceiver module 1250 and record a beacon receipt time for the beacon. The WLAN discovery module 210-*g* may then compute a beacon timing correction based on i) the beacon receipt time, and ii) a beacon transmission time indicated by the beacon transmission schedule received by the WLAN discovery module 210-*g*. In some cases, the beacon timing correction may be a simple timing difference between the beacon receipt time and the beacon transmission time indicated by the beacon transmission schedule.

The beacon timing correction may be reported (e.g., transmitted via the transceiver module 1250 and antennas 1240) to the WAP that transmitted the beacon. In this manner, the beacon timing correction may be used by the WAP to adjust the timing of its beacon and/or the timing information that indicates when it will broadcast its beacon. In some cases, the magnitude of the beacon timing correction may be compared to a threshold, and then only reported to the WAP when the magnitude of the beacon timing correction exceeds the threshold.

The components of UE 115-*d* may be configured to implement other aspects discussed above with respect to device 600, 700 shown in FIG. 6 or 7, and these aspects may not be repeated here for the sake of brevity.

Figure 13:
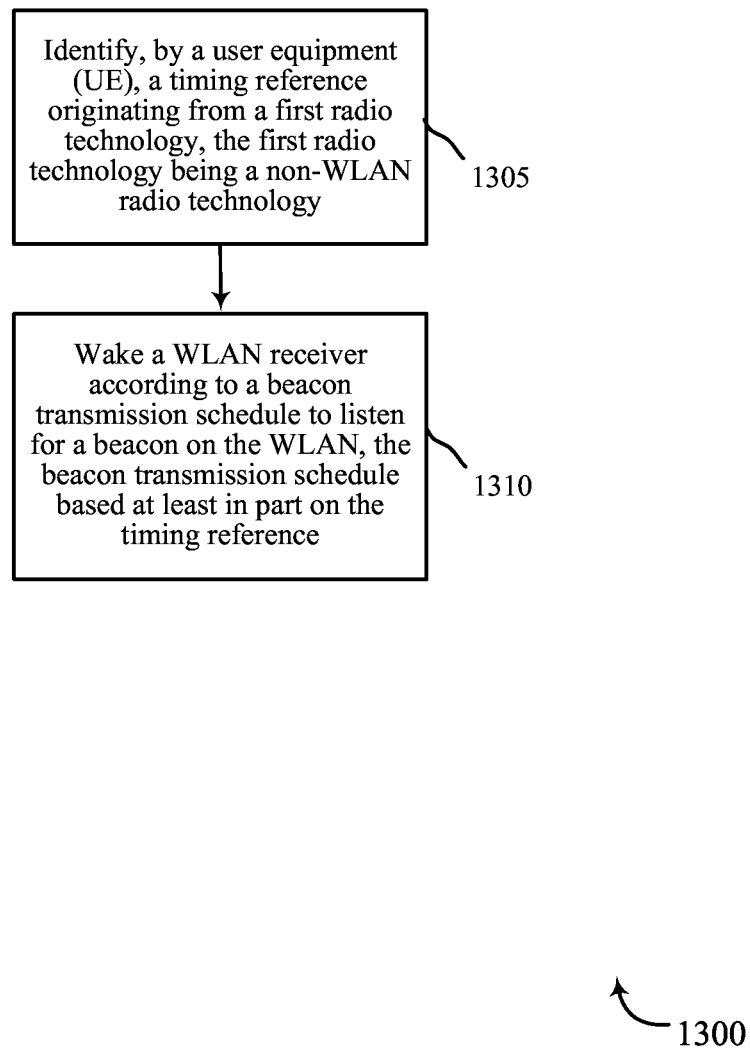
FIG. 13 is a flow chart illustrating an example of a method for assisting discovery of a WLAN.

FIG. 13 is a flow chart illustrating an example of a method 1300 for assisting discovery of a WLAN. For clarity, the method 1300 is described below with reference to one of the UEs 115 shown in FIG. 1, 10, 11 or 12 or one of the devices 200, 600, 700 shown in FIG. 2, 6 or 7. In one implementation, the WLAN discovery module 210 may execute one or more sets of codes to control the functional elements of a UE 115 to perform the functions described below.

At block 1305, a timing reference originating from a non-WLAN radio technology (a first radio technology) may be received by a UE 115. At block 1310, a WLAN receiver (a second radio technology) of the UE may be awakened according to a beacon transmission schedule to listen for a beacon on the WLAN. The beacon transmission schedule may be based at least in part on the timing reference.

The method 1300 may provide an efficient way to discover a WLAN, wherein a UE 115 may receive a timing reference for discovering a WAP using a non-WLAN radio technology, and before the UE 115 needs to listen for a beacon on the WLAN. This may enable the UE 115 to wake a WLAN receiver of the UE over a shorter period, thereby conserving power and beacon scanning time. It should be noted that the method 1300 is just one implementation and that the operations of the method 1300 may be rearranged or otherwise modified such that other implementations are possible.

Figure 14:
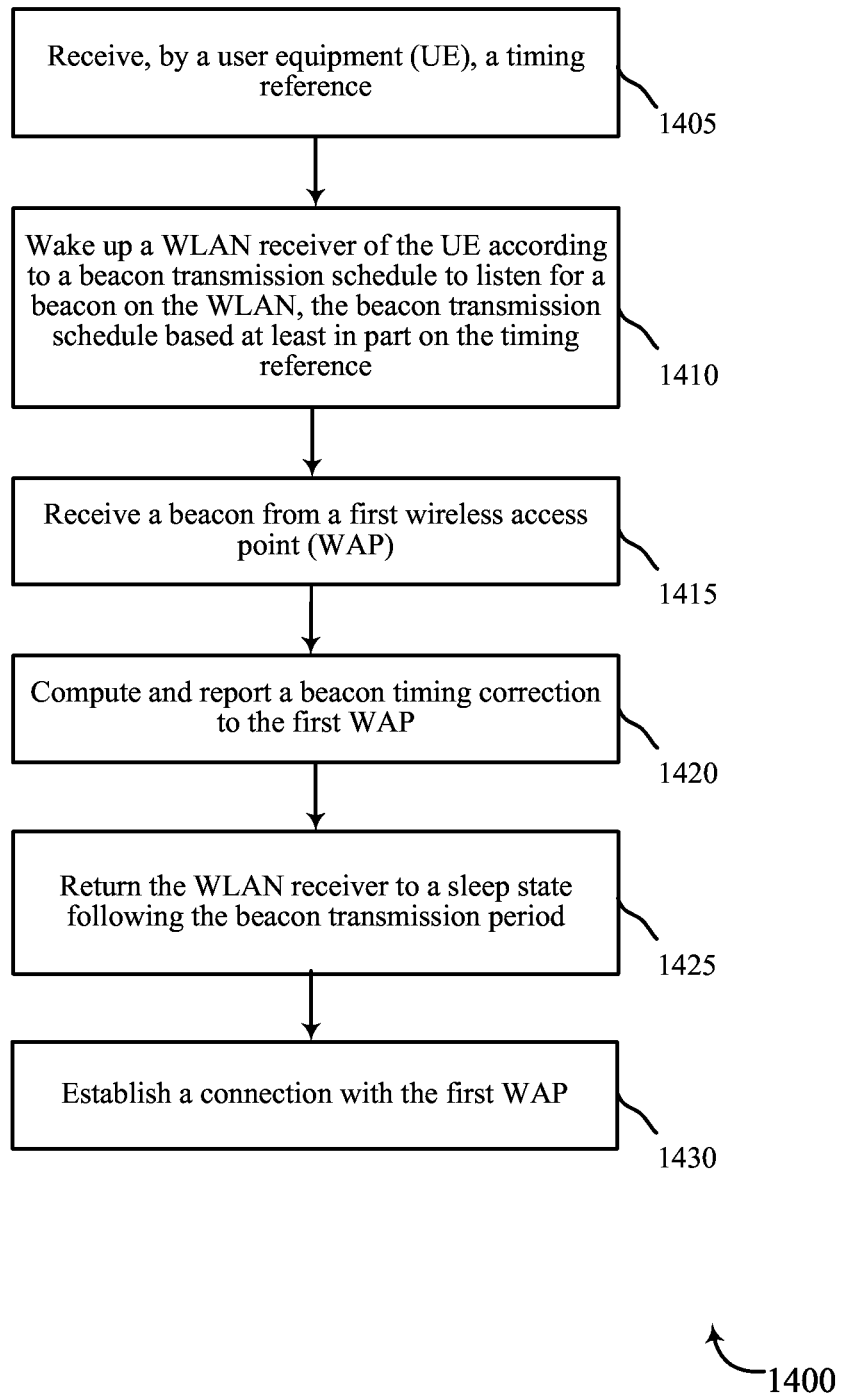
FIG. 14 is a flow chart illustrating one example of a more detailed implementation of the method shown in FIG. 13.

FIG. 14 is a flow chart illustrating one example 1400 of a more detailed implementation of the method 1300 shown in FIG. 13. For clarity, the method 1400 is described below with reference to one of the UEs 115 shown in FIG. 1, 10, 11 or 12 or one of the devices 200, 600, 700 shown in FIG. 2, 6 or 7. In one implementation, the WLAN discovery module 210 may execute one or more sets of codes to control the functional elements of a UE 115 to perform the functions described below.

At block 1405, a timing reference may be received by a UE 115. The timing reference may originate, for example, from a cellular or satellite network. At block 1410, a WLAN receiver of the UE may be woke up to listen for a beacon on the WLAN according to a beacon transmission schedule. The beacon transmission schedule may be based at least in part on the timing reference.

At block 1415, a beacon may be received from a first WAP, which in some cases may be one of the WAPs 140 shown in FIG. 1. At block 1420, a beacon timing correction may be computed and reported to the first WAP. At block 1425, the WLAN receiver of the UE 115 may be returned to a sleep state following the beacon transmission period. In some cases, the return to the sleep state may occur upon expiration of a timer. At block 1430, the UE 115 may establish a connection with the first WAP 140.

The method 1400 may provide an efficient way to discover a WLAN, wherein a UE 115 may receive a timing reference for discovering a WAP on the WLAN using a cellular or satellite network, before the UE 115 needs to listen for a beacon on the WLAN. This may enable the UE 115 to wake a WLAN receiver of the UE 115 over a shorter period, thereby conserving power and beacon scanning time. It should be noted that the method 1400 is just one implementation and that the operations of the method 1400 may be rearranged or otherwise modified such that other implementations are possible.

Figure 15:
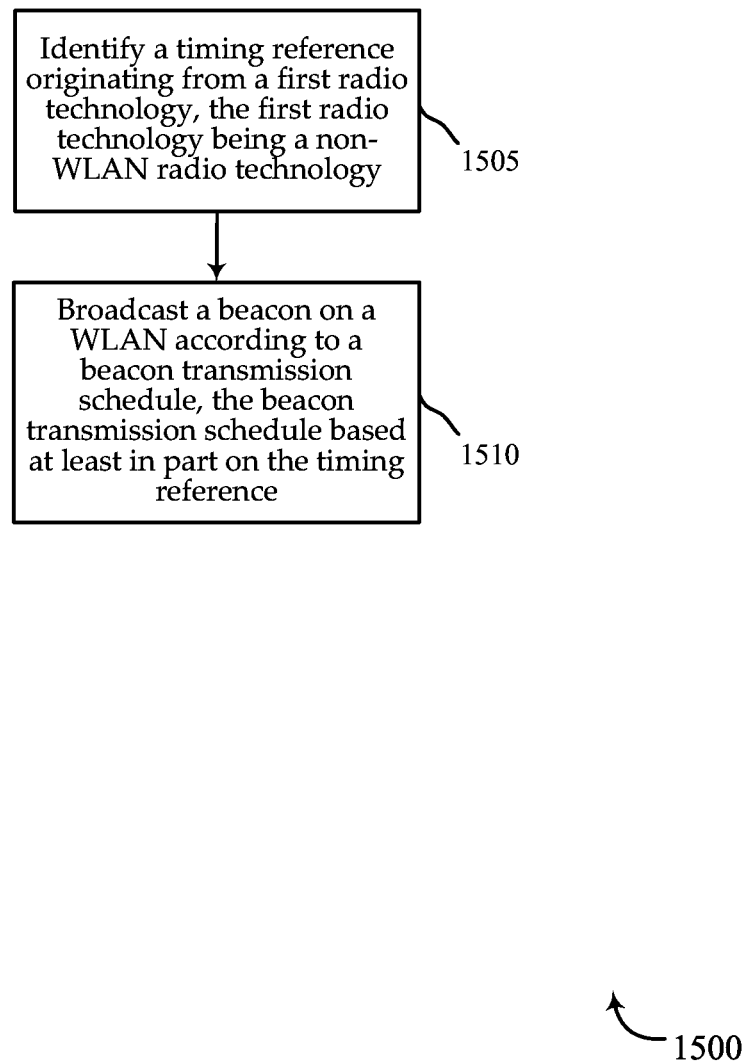
FIG. 15 is a flow chart illustrating one example of a method for assisting discovery of a WLAN.

FIG. 15 is a flow chart illustrating one example of a method 1500 for assisting discovery of a WLAN. For clarity, the method 1500 is described below with reference to one of the WAPs 140 shown in FIG. 1 or one of the devices 200, 300, 400, or 500 shown in FIG. 2, 3, 4 or 5. In one implementation, the WLAN discovery module 210 may execute one or more sets of codes to control the functional elements of a WAP to perform the functions described below.

At block 1505, a WAP 140 identifies a timing reference originating from a non-WLAN radio technology (a first radio technology). In one example, the timing reference may be a timing of a cellular network, such as a frame timing. In other examples, the timing reference may be the timing of a satellite network or a network protocol timing (NTP). The non-WLAN radio technology may in some cases be a cellular network or satellite network. At block 1510, the WAP 140 broadcasts a beacon on a WLAN (a second radio technology) according to a beacon transmission schedule. The beacon transmission schedule may be based at least in part on the timing reference.

Thus, the method 1500 may provide an efficient way to discover a WLAN, wherein a non-WLAN radio technology is used to provide a timing reference for broadcasting beacons over a WLAN radio technology. It should be noted that the method 1500 is just one implementation and that the operations of the method 1500 may be rearranged or otherwise modified such that other implementations are possible.

Figure 16:
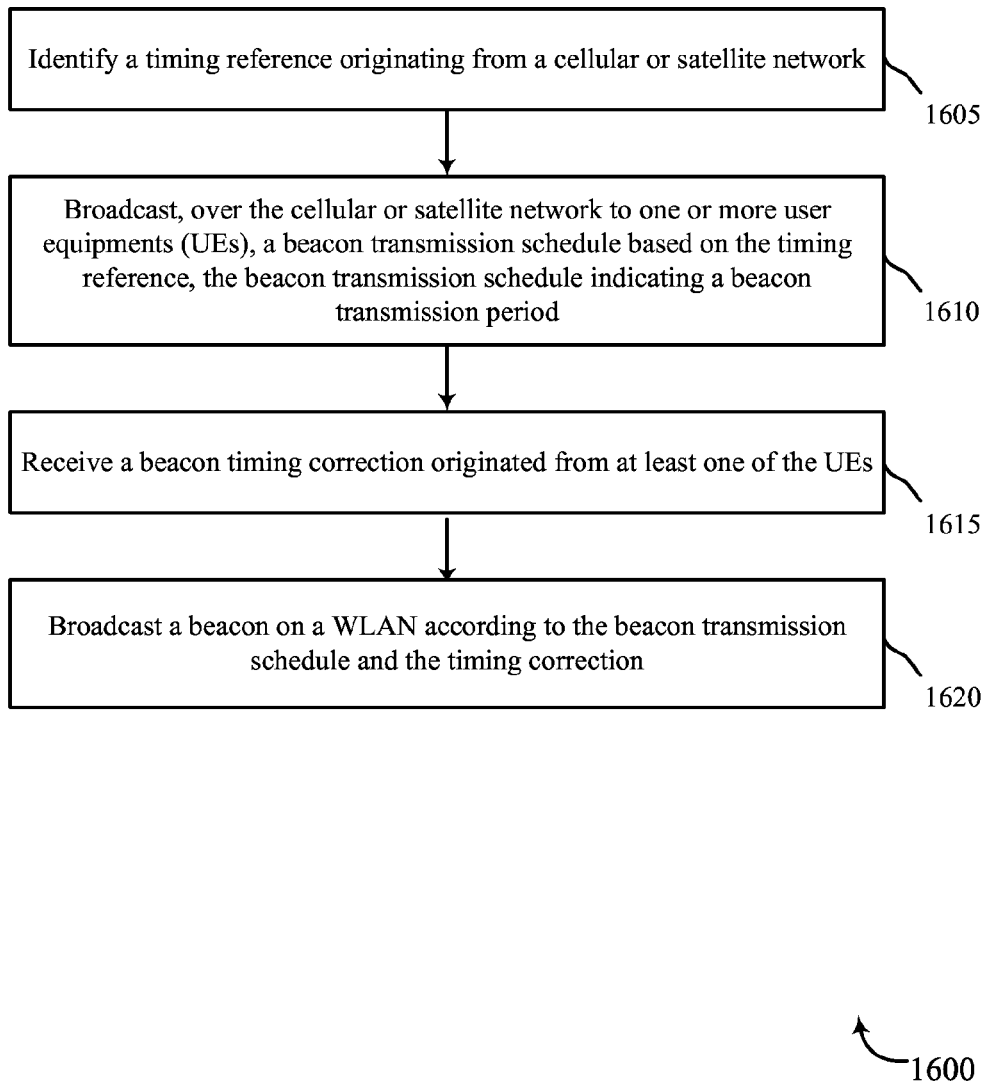
FIG. 16 is a flow chart illustrating one example of a more detailed implementation of the method shown in FIG. 15.

FIG. 16 is a flow chart illustrating one example 1600 of a more detailed implementation of the method 1400 shown in FIG. 15. For clarity, the method 1600 is described below with reference to one of the WAPs 140 shown in FIG. 1 or one of the devices 200, 300, 400, or 500 shown in FIG. 2, 3, 4 or 5. In one implementation, the WLAN discovery module 210 may execute one or more sets of codes to control the functional elements of a WAP to perform the functions described below.

At block 1605, a timing reference may be identified. The timing reference may, for example, originate from a cellular or satellite network. In an LTE environment, and by way of example, the timing reference may be the timing of a superframe boundary combined with a SFN.

At block 1610, a beacon transmission schedule based on the timing reference may be broadcast over the cellular or satellite network to one or more UEs, such as one or more of the UEs 115 shown in FIGS. 1, 10, and/or 12 or any of the devices 200, 600, or 700, shown in FIG. 2, 6, or 7. In an LTE embodiment where the timing reference is the timing of a superframe boundary combined with a SFN, the start of the beacon transmission period may be tied to the start of the SFN (e.g., the beacon transmission period may start each time the SFN modulo 20 is equal to zero).

When multiple WAPs are able to send beacons and data over the same channel of operation of the WLAN, beacon overlap may be avoided if the beacon transmission schedule defines a beacon transmission period (or beacon transmission window), and if each WAP broadcasts its beacon at a random or pseudo-random time within the beacon transmission period. For purposes of this disclosure, a "random" time is defined to include a "pseudo-random" time (e.g., a time based on a random enough seed value). In these cases, the size of the beacon transmission period may be set based on an estimated number of beacon transmissions in a geographic area. As will be explained in the context of FIG. 17, beacon overlap may also be avoided by transmitting the beacons of different WAPs in different slots of the beacon transmission period.

At block 1615, a beacon timing correction originated from one or more of the UEs 115 may be received. The beacon timing correction may identify a difference between 1) a beacon receipt time of one or more of the UEs (e.g., a single beacon receipt time or an average of multiple beacon receipt times), and 2) a beacon transmission time indicated by the beacon transmission schedule. The beacon timing correction may be used by the WAP to account for skew or other timing irregularities in its copy of the timing reference, or delays inherent in the circuitry or processes of the WAP.

Thus, the method 1600 may provide an efficient way to discover a WLAN, wherein a cellular or satellite network may be used to provide a timing reference and beacon transmission schedule for broadcasting beacons over a WLAN. It should be noted that the method 1600 is just one implementation and that the operations of the method 1600 may be rearranged or otherwise modified such that other implementations are possible.

Figure 17:
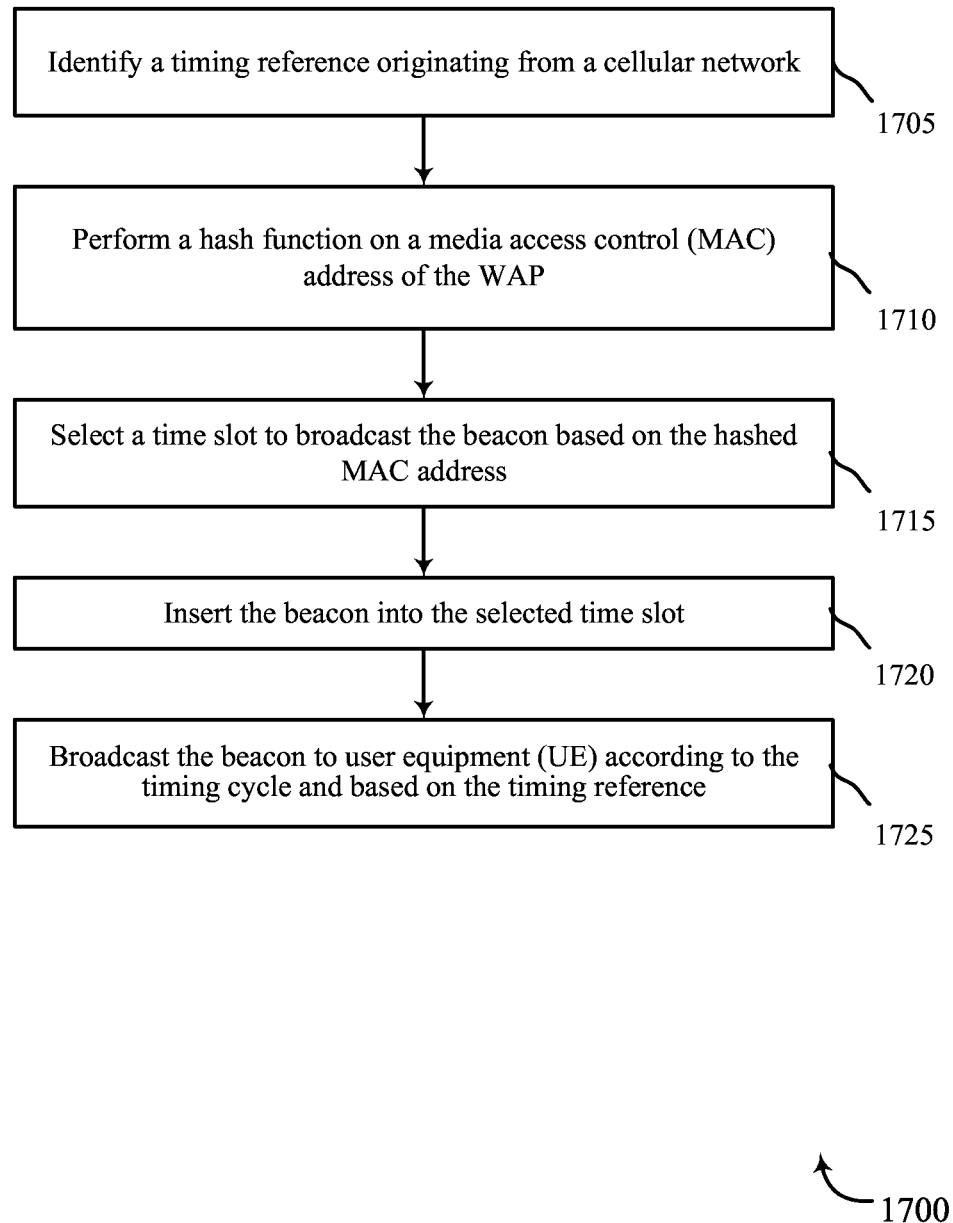
FIG. 17 is a flow chart illustrating another example of a more detailed implementation of the method shown in FIG. 15.

FIG. 17 is a flow chart illustrating another example 1700 of a more detailed implementation of the method 1500 shown in FIG. 15. For clarity, the method 1700 is described below with reference to one of the WAPs 140 shown in FIG. 1 or one of the devices 200, 300, 400, or 500 shown in FIG. 2, 3, 4 or 5. In one implementation, the WLAN discovery module 210 may execute one or more sets of codes to control the functional elements of a WAP to perform the functions described below.

At block 1705, a timing reference originating from a cellular network may be identified. In some examples, the timing reference may be received from an eNodeB via a back-end server that may be part of a cellular core network. In other examples, the timing reference may be received during a boot up procedure from the back-end server. In these examples, the timing reference may be received according to a network time protocol (NTP). In still other examples, the timing reference may be received from a UE via the WLAN. In the latter instance, the UE may function as a form of mobile base station (or base station proxy) of the cellular core network.

At block 1710, a hash function may be performed on a media access control (MAC) address of the WAP, and at block 1715, a time slot within a beacon transmission period of a beacon transmission schedule may be selected based on the hashed MAC address. As described in the context of FIG. 3, this may reduce the likelihood of WAPs broadcasting their beacons at the same time, which may leave UEs unable to decipher their beacons.

At block 1720, a beacon may be inserted into a selected time slot, and at block 1725, the beacon may be broadcast to a UE according to a beacon transmission schedule based at least in part on the timing reference, and on the selected timing slot.

Thus, the method 1700 may provide an efficient way to discover a WLAN, wherein a cellular network may be used to provide a timing reference for broadcasting beacons over a WLAN. It should be noted that the method 1700 is just one implementation and that the operations of the method 1700 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, WLAN and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). An WLAN system may implement a radio technology based on the IEEE 802.11 (Wi-Fi) standard. The techniques described herein may be used for the systems and radio technologies mentioned above as well as other systems and radio technologies. The description below, however, describes LTE and Wi-Fi systems for purposes of example, and LTE and Wi-Fi terminology is used in much of the description below, although the techniques are applicable beyond LTE and Wi-Fi applications.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for assisting discovery of a wireless local area network (WLAN), comprising:
   identifying, by a user equipment (UE), a timing reference originating from a first radio technology, the first radio technology being a non-WLAN radio technology; and
   waking a WLAN receiver according to a first beacon transmission schedule to listen for a beacon on the WLAN, the first beacon transmission schedule based at least in part on the timing reference, and the first beacon transmission schedule comprising a smaller time window than a second expected beacon transmission schedule.

2. The method of claim 1, wherein the first beacon transmission schedule indicates when a beacon transmission period occurs on the WLAN.

3. The method of claim 2, further comprising:
   receiving a beacon from a first wireless access point (WAP) in a first WLAN during one or more beacon transmission periods; and
   establishing a connection with the first WAP in the WLAN.

4. The method of claim 2, further comprising:
   receiving a plurality of beacons during a single beacon transmission period, the plurality of beacons being received from a plurality of wireless access points (WAPs) in a first WLAN.

5. The method of claim 2, further comprising:
   returning the WLAN receiver to a sleep state following the beacon transmission period.

6. The method of claim 2, wherein the beacon transmission period corresponds to a first channel of operation of the WLAN, the method further comprising:
   keeping the WLAN receiver awake during a second beacon transmission period corresponding to a second channel of operation of the WLAN, the second beacon transmission period following the first beacon transmission period.

7. The method of claim 6, further comprising:
   keeping the WLAN receiver awake during an offset between the beacon transmission period and the second beacon transmission period, the offset based on at least a time to tune the WLAN receiver from the first channel to the second channel.

8. The method of claim 1, further comprising:
   receiving the first beacon transmission schedule from a source comprising the non-WLAN radio technology.

9. The method of claim 1, further comprising:
   transmitting the timing reference to one or more wireless access points (WAPs) in a first WLAN.

10. The method of claim 1, wherein the timing reference is a timing of a cellular network or a satellite network.

11. The method of claim 1, further comprising:
    recording a beacon receipt time of a beacon received via the WLAN receiver from a first wireless access point (WAP);
    computing a beacon timing correction based on the beacon receipt time and a beacon transmission time indicated by the first beacon transmission schedule; and
    transmitting the beacon timing correction.

12. The method of claim 1, further comprising:
recording a beacon receipt time of a beacon received via the WLAN receiver from a first wireless access point (WAP);
computing a beacon timing correction based on the beacon receipt time and a beacon transmission time indicated by the first beacon transmission schedule;
comparing a magnitude of the beacon timing correction to a threshold; and
transmitting the beacon timing correction when the magnitude of the beacon timing correction exceeds the threshold.

13. The method of claim 1, further comprising:
selecting the timing reference from among a plurality of available timing references.

14. A user equipment (UE) for assisting discovery of a wireless local area network (WLAN), comprising:
a processor; and
a memory in electronic communication with the processor, the memory embodying instructions, the instructions be executable by the processor to:
identify a timing reference originating from a first radio technology, the first radio technology being a non-WLAN radio technology; and
wake a WLAN receiver according to a first beacon transmission schedule to listen for a beacon on the WLAN, the first beacon transmission schedule based at least in part on the timing reference, and the first beacon transmission schedule comprising a smaller time window than a second expected beacon transmission schedule.

15. The UE of claim 14, wherein the first beacon transmission schedule indicates when a beacon transmission period occurs on the WLAN.

16. The UE of claim 15, wherein the instructions are executable by the processor to:
receive a beacon from a first wireless access point (WAP) in a first WLAN during one or more beacon transmission periods; and
establish a connection with the first WAP in the WLAN.

17. The UE of claim 15, wherein the instructions are executable by the processor to:
receive a plurality of beacons during a single beacon transmission period, the plurality of beacons being received from a plurality of wireless access points (WAPs) in a first WLAN.

18. The UE of claim 15, wherein the instructions are executable by the processor to:
return the WLAN receiver to a sleep state following the beacon transmission period.

19. The UE of claim 15, wherein the beacon transmission period corresponds to a first channel of operation of the WLAN, and wherein the instructions are executable by the processor to:
keep the WLAN receiver awake during a second beacon transmission period corresponding to a second channel of operation of the WLAN, the second beacon transmission period following the first beacon transmission period.

20. The UE of claim 19, wherein the beacon transmission period corresponds to a first channel of operation of the WLAN, and wherein the instructions are executable by the processor to:
keep the WLAN receiver awake during an offset between the beacon transmission period and the second beacon transmission period, the offset based on at least a time to tune the WLAN receiver from the first channel to the second channel.

21. The UE of claim 14, wherein the instructions are executable by the processor to:
receive the first beacon transmission schedule from a source comprising the non-WLAN radio technology.

22. The UE of claim 14, wherein the instructions are executable by the processor to:
transmit the timing reference to one or more wireless access points (WAPs) in a first WLAN.

23. The UE of claim 14, wherein the timing reference is a timing of a cellular network or a satellite network.

24. The UE of claim 14, wherein the instructions are executable by the processor to:
record a beacon receipt time of a beacon received via the WLAN receiver from a first wireless access point (WAP);
compute a beacon timing correction based on the beacon receipt time and a beacon transmission time indicated by the first beacon transmission schedule; and
transmit the beacon timing correction.

25. The UE of claim 14, wherein the instructions are executable by the processor to:
record a beacon receipt time of a beacon received via the WLAN receiver from a first wireless access point (WAP);
compute a beacon timing correction based on the beacon receipt time and a beacon transmission time indicated by the first beacon transmission schedule;
compare a magnitude of the beacon timing correction to a threshold; and
transmit the beacon timing correction when the magnitude of the beacon timing correction exceeds the threshold.

26. The UE of claim 14, wherein the instructions are executable by the processor to:
select the timing reference from among a plurality of available timing references.

27. A user equipment (UE) for assisting discovery of a wireless local area network (WLAN), comprising:
means for identifying a timing reference originating from a first radio technology, the first radio technology being a non-WLAN radio technology; and
means for waking a WLAN receiver according to a first beacon transmission schedule to listen for a beacon on the WLAN, the first beacon transmission schedule based at least in part on the timing reference, and the first beacon transmission schedule comprising a smaller time window than a second expected beacon transmission schedule.

28. The UE of claim 27, wherein the first beacon transmission schedule indicates when a beacon transmission period occurs on the WLAN.

29. The UE of claim 28, further comprising:
means for receiving a beacon from a first wireless access point (WAP) in a first WLAN during one or more beacon transmission periods; and
means for establishing a connection with the first WAP in the WLAN.

30. The UE of claim 28, further comprising:
means for returning the WLAN receiver to a sleep state following the beacon transmission period.

31. The UE of claim 27, wherein the timing reference is a timing of a cellular network or a satellite network.

32. A computer program product for assisting discovery of a wireless local area network (WLAN), the computer program product comprising a non-transitory computer-readable medium storing instructions executable by a processor to:

identify, by a user equipment (UE), a timing reference originating from a first radio technology, the first radio technology being a non-WLAN radio technology; and wake a WLAN receiver according to a first beacon transmission schedule to listen for a beacon on the WLAN, the first beacon transmission schedule based at least in part on the timing reference, and the first beacon transmission schedule comprising a smaller time window than a second expected beacon transmission schedule.

33. The computer program product of claim 32, wherein the first beacon transmission schedule indicates when a beacon transmission period occurs on the WLAN.

34. The computer program product of claim 33, wherein the instructions are executable by the processor to:
receive a beacon from a first wireless access point (WAP) in a first WLAN during one or more beacon transmission periods; and
establish a connection with the first WAP in the WLAN.

35. The computer program product of claim 33, wherein the instructions are executable by the processor to:
return the WLAN receiver to a sleep state following the beacon transmission period.

36. The computer program product of claim 32, wherein the timing reference is a timing of a cellular network or a satellite network.

37. A method for assisting discovery of a wireless local area network (WLAN), comprising:
identifying a timing reference originating from a first radio technology, the first radio technology being a non-WLAN radio technology; and
broadcasting a beacon on the WLAN according to a first beacon transmission schedule, the first beacon transmission schedule based at least in part on the timing reference, and the first beacon transmission schedule comprising a smaller time window than a second expected beacon transmission schedule.

38. The method of claim 37, further comprising:
receiving the timing reference from a source comprising the non-WLAN radio technology.

39. The method of claim 37, further comprising:
receiving the timing reference from a back-end server according to a network time protocol (NTP).

40. The method of claim 37, further comprising:
receiving the timing reference on the WLAN from a user equipment (UE).

41. The method of claim 37, further comprising:
receiving the first beacon transmission schedule from a source comprising the non-WLAN radio technology.

42. The method of claim 37, further comprising:
broadcasting the first beacon transmission schedule to one or more user equipments (UEs) using the non-WLAN radio technology.

43. The method of claim 37, wherein the first beacon transmission schedule indicates when a beacon transmission period occurs on the WLAN, the method further comprising:
selecting one of a plurality of time slots within the beacon transmission period to broadcast the beacon; and
inserting the beacon into the selected time slot.

44. The method of claim 43, wherein selecting one of the plurality of time slots comprises:
performing a hash function on a media access control (MAC) address.

45. The method of claim 37, wherein:
the first beacon transmission schedule indicates when a beacon transmission period occurs on the WLAN; and
broadcasting the beacon comprises broadcasting the beacon at a random time within the beacon transmission period.

46. The method of claim 37, further comprising:
receiving a beacon timing correction; and
broadcasting the beacon according to the beacon timing correction.

47. The method of claim 37, wherein the timing reference is a timing of a cellular network or a satellite network.

48. The method of claim 37, further comprising:
selecting the timing reference from among a plurality of available timing references.

49. A wireless access point (WAP) for assisting discovery of a wireless local area network (WLAN), comprising:
a processor; and
memory in electronic communication with the processor, the memory embodying instructions, the instructions being executable by the processor to:
identify a timing reference originating from a first radio technology, the first radio technology being a non-WLAN radio technology; and
broadcast a beacon on the WLAN according to a first beacon transmission schedule, the first beacon transmission schedule based at least in part on the timing reference, and the first beacon transmission schedule comprising a smaller time window than a second expected beacon transmission schedule.

50. The WAP of claim 49, wherein the instructions are executable by the processor to:
receive the timing reference from a source comprising the non-WLAN radio technology.

51. The WAP of claim 49, wherein the instructions are executable by the processor to:
receive the timing reference from a back-end server according to a network time protocol (NTP).

52. The WAP of claim 49, wherein the instructions are executable by the processor to:
receive the timing reference on the WLAN from a user equipment (UE).

53. The WAP of claim 49, wherein the instructions are executable by the processor to:
receive the first beacon transmission schedule from a source.

* * * * *